(12) United States Patent
Mishima

(10) Patent No.: US 12,718,986 B2
(45) Date of Patent: Aug. 25, 2026

(54) MULTILAYER CERAMIC CAPACITOR INCLUDING CONDUCTIVE RESIN LAYER WITH PEELING REGION

(71) Applicant: Murata Manufacturing Co., Ltd., Nagaokakyo (JP)

(72) Inventor: Yasuhiro Mishima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 114 days.

(21) Appl. No.: 18/740,747

(22) Filed: Jun. 12, 2024

(65) Prior Publication Data

US 2025/0111995 A1 Apr. 3, 2025

Related U.S. Application Data

(63) Continuation of application No. PCT/JP2023/035697, filed on Sep. 29, 2023.

(51) Int. Cl.
*H01G 4/232* (2006.01)
*H01G 4/30* (2006.01)
*H01G 4/12* (2006.01)

(52) U.S. Cl.
CPC ............ *H01G 4/2325* (2013.01); *H01G 4/30* (2013.01); *H01G 4/12* (2013.01)

(58) Field of Classification Search
None
See application file for complete search history.

(56) References Cited

U.S. PATENT DOCUMENTS

2014/0063683 A1* 3/2014 Gu ...................... H01G 4/2325 427/79
2014/0085770 A1* 3/2014 Park ...................... H01G 4/008 427/79
2016/0027583 A1 1/2016 Ahn et al.
2017/0223832 A1 8/2017 Chung et al.
2019/0362895 A1 11/2019 Kobayashi et al.
(Continued)

FOREIGN PATENT DOCUMENTS

JP H04329616 A * 11/1992
JP H11162771 A 6/1999
(Continued)

OTHER PUBLICATIONS

International Search Report and Written Opinion in PCT/JP2023/035697, mailed Dec. 12, 2023, 8 pages.

*Primary Examiner* — Eric W Thomas
(74) *Attorney, Agent, or Firm* — Keating & Bennett, LLP

(57) ABSTRACT

A multilayer ceramic capacitor includes a multilayer body and external electrodes, which each include a base electrode layer, an electrically conductive resin layer, and a plated layer. The electrically conductive resin layer at a ridge portion of the multilayer body has a film thickness of about 0.8 μm or more and about 8 μm or less. The electrically conductive resin layer includes a peeling region separating from the multilayer body at least one extending portion. The peeling region extends from an end portion of the electrically conductive resin layer adjacent to a middle of the multilayer body in a length direction to before an end of the base electrode layer adjacent to the middle of the multilayer body in the length direction. The peeling region has a dimension of about 5 μm or more in the length direction.

20 Claims, 8 Drawing Sheets

(56) References Cited

U.S. PATENT DOCUMENTS

| | | | |
|---|---|---|---|
| 2020/0312563 | A1 | 10/2020 | Nagai et al. |
| 2023/0126382 | A1 | 4/2023 | Katsube et al. |

FOREIGN PATENT DOCUMENTS

| | | | |
|---|---|---|---|
| JP | 2002270034 | A | 9/2002 |
| JP | 2005032471 | A | 2/2005 |
| JP | 2008166301 | A | 7/2008 |
| JP | 2016032091 | A | 3/2016 |
| JP | 2019204836 | A | 11/2019 |
| JP | 2020161518 | A | 10/2020 |
| JP | 2023013036 | A | 1/2023 |
| JP | 2023064513 | A | 5/2023 |
| KR | 20170092254 | A | 8/2017 |

* cited by examiner 1
10a
10a1
10a2
10a3
10a4
10
11
11E
12A
12B
20
30
31
31A
31B
32
32A
32B
40A
40B
50A
50B
50Aa
50Ba
60A
60B
60Aa
60Ba
70A
70B
71A
71B
72A
72B
E
E1
E2
E3
E4
P
P1
P2
P3
P4
d1
d2
d3
d4
LG1
LG2
LS1
LS2
TS1
TS2
III
IV
V
X
Y
Z TS
TS1,TS2
20
30
32
31
10
60Aa,60Ba
P
P1～P4
d
d1～d4
E
E1～E4
50Aa,50Ba
θ
θ
t
1
10a
10a1～10a4
LS
LS1,LS2
50
50A,50B
60
60A,60B
70
70A,70B
71
71A,71B
72
72A,72B
40
40A,40B
X
Y
Z

MULTILAYER CERAMIC CAPACITOR INCLUDING CONDUCTIVE RESIN LAYER WITH PEELING REGION

CROSS REFERENCE TO RELATED APPLICATIONS

This application claims the benefit of priority to PCT Application No. PCT/JP2023/035697 filed on Sep. 29, 2023. The entire contents of each application are hereby incorporated herein by reference.

BACKGROUND OF THE INVENTION

1. Field of the Invention

The present invention relates to multilayer ceramic capacitors.

2. Description of the Related Art

In recent years, multilayer ceramic capacitors are required to be durable under severe environments such as bending stress due to thermal expansion, and a known technique adopts a thermosetting electrically conductive resin paste for external electrodes on the multilayer ceramic capacitor. Japanese Unexamined Patent Application Publication No. H11-162771 discloses this type of technology. Japanese Unexamined Patent Application Publication No. H11-162771 discloses a multilayer ceramic capacitor including external electrodes, each including a layer structure in which an electrode layer prepared by dipping an electrically conductive paste and firing the resulting electrode layer, an electrically conductive epoxy thermosetting resin layer, a nickel plated layer, and a tin-based layer are sequentially laminated.

SUMMARY OF THE INVENTION

However, in the multilayer ceramic capacitor, cracks or the like may occur in the multilayer body due to a bending stress generated in the external electrode being transmitted to the multilayer body when the multilayer ceramic capacitor is mounted on a substrate or the like, and thus an improvement in bending resistance is demanded.

Example embodiments of the present invention provide multilayer ceramic capacitors that are each able to improve bending resistance.

According to an example embodiment of the present invention, a multilayer ceramic capacitor includes a multilayer body including a plurality of dielectric layers that are laminated, a first main surface and a second main surface that are opposed to each other in a height direction, a first lateral surface and a second lateral surface that are opposed to each other in a width direction orthogonal or substantially orthogonal to the height direction, and a first end surface and a second end surface that are opposed to each other in a length direction orthogonal or substantially orthogonal to the height direction and the width direction, a first internal electrode layer that is on each of the plurality of dielectric layers and exposed at the first end surface, a second internal electrode layer that is on each of the plurality of dielectric layers and exposed at the second end surface, a first external electrode on the first end surface; and a second external electrode on the second end surface, in which each of the first external electrode and the second external electrode includes a base electrode layer including a metal component, an electrically conductive resin layer that is on the base electrode layer and includes a filler powder and a resin component, and a plated layer on the electrically conductive resin layer, the first external electrode and the second external electrode respectively include extending portions, each extending to a portion of the first main surface and a portion of the second main surface, the multilayer body includes a ridge portion at each of a portion where the first end surface and the first main surface intersect, a portion where the first end surface and the second main surface intersect, a portion where the second end surface and the first main surface intersect, and a portion where the second end surface and the second main surface intersect, the electrically conductive resin layer is provided at each ridge portion of the multilayer body, the electrically conductive resin layer at the ridge portion has a film thickness of about 0.8 μm or more and about 8 μm or less, the electrically conductive resin layer includes a peeling region separating from the multilayer body at least in one of the extending portions, the peeling region extends from an end portion of the electrically conductive resin layer adjacent to a middle of the multilayer body in the length direction to before an end of the base electrode layer adjacent to the middle of the multilayer body in the length direction, and the peeling region has a dimension of about 5 μm or more in the length direction.

According to the example embodiments of the present invention, it is possible to provide multilayer ceramic capacitors that are each able to improve bending resistance.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example Embodiment

Figure 1:
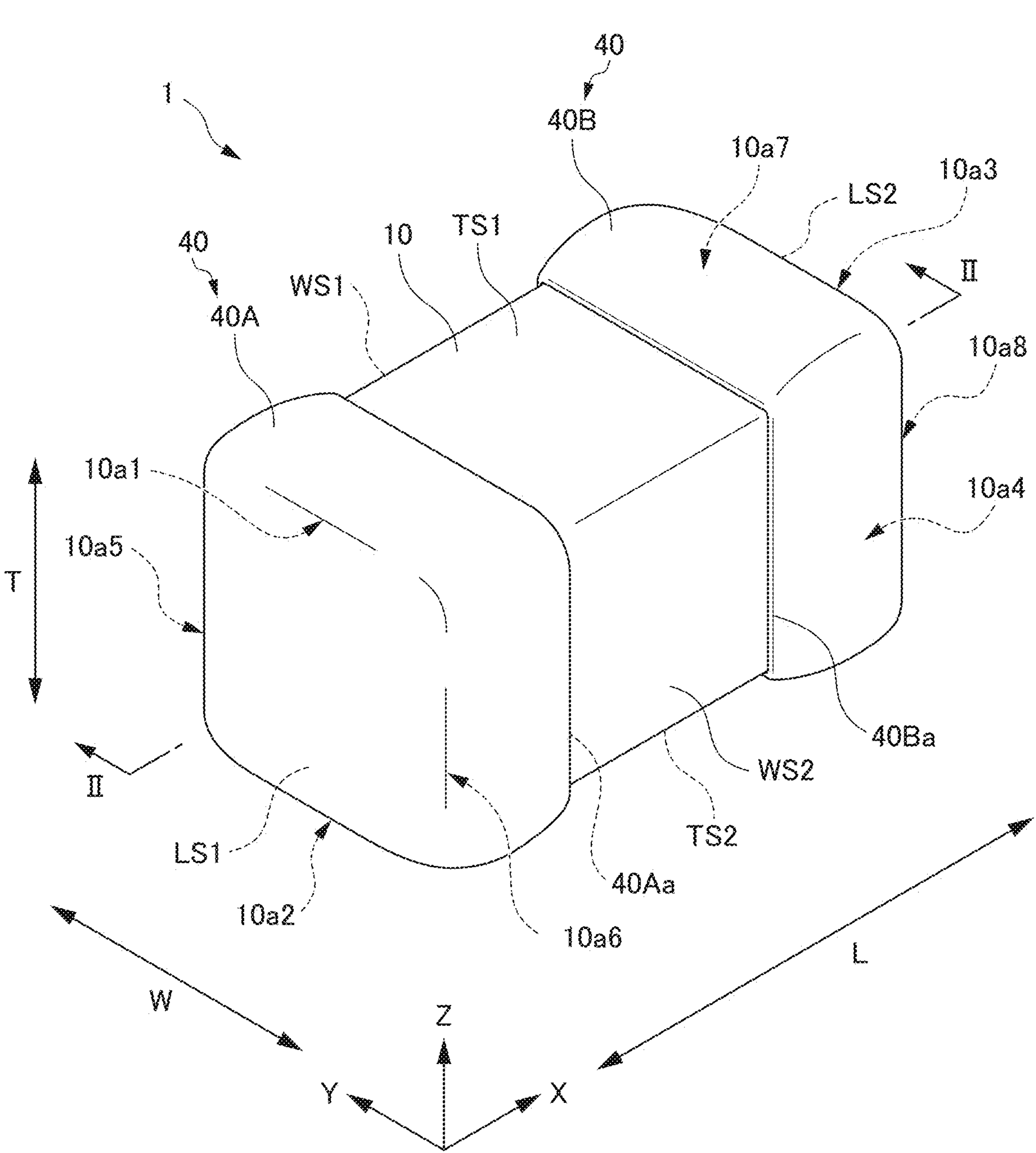
FIG. 1 is an external perspective view of a multilayer ceramic capacitor of an example embodiment of the present invention.
Figure 2:
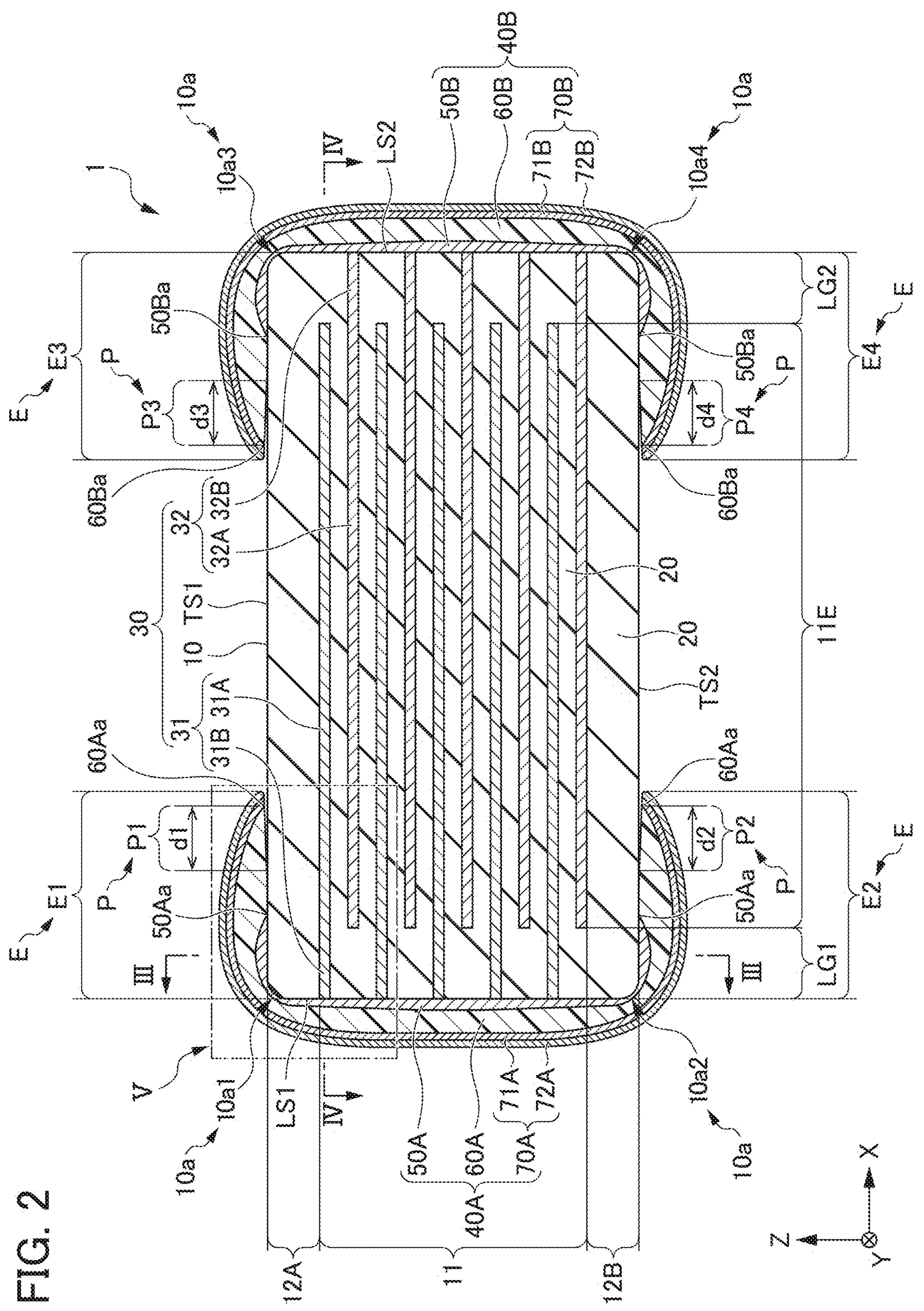
FIG. 2 is a cross-sectional view taken along the line II-II of the multilayer ceramic capacitor of FIG. 1.
Figure 3:
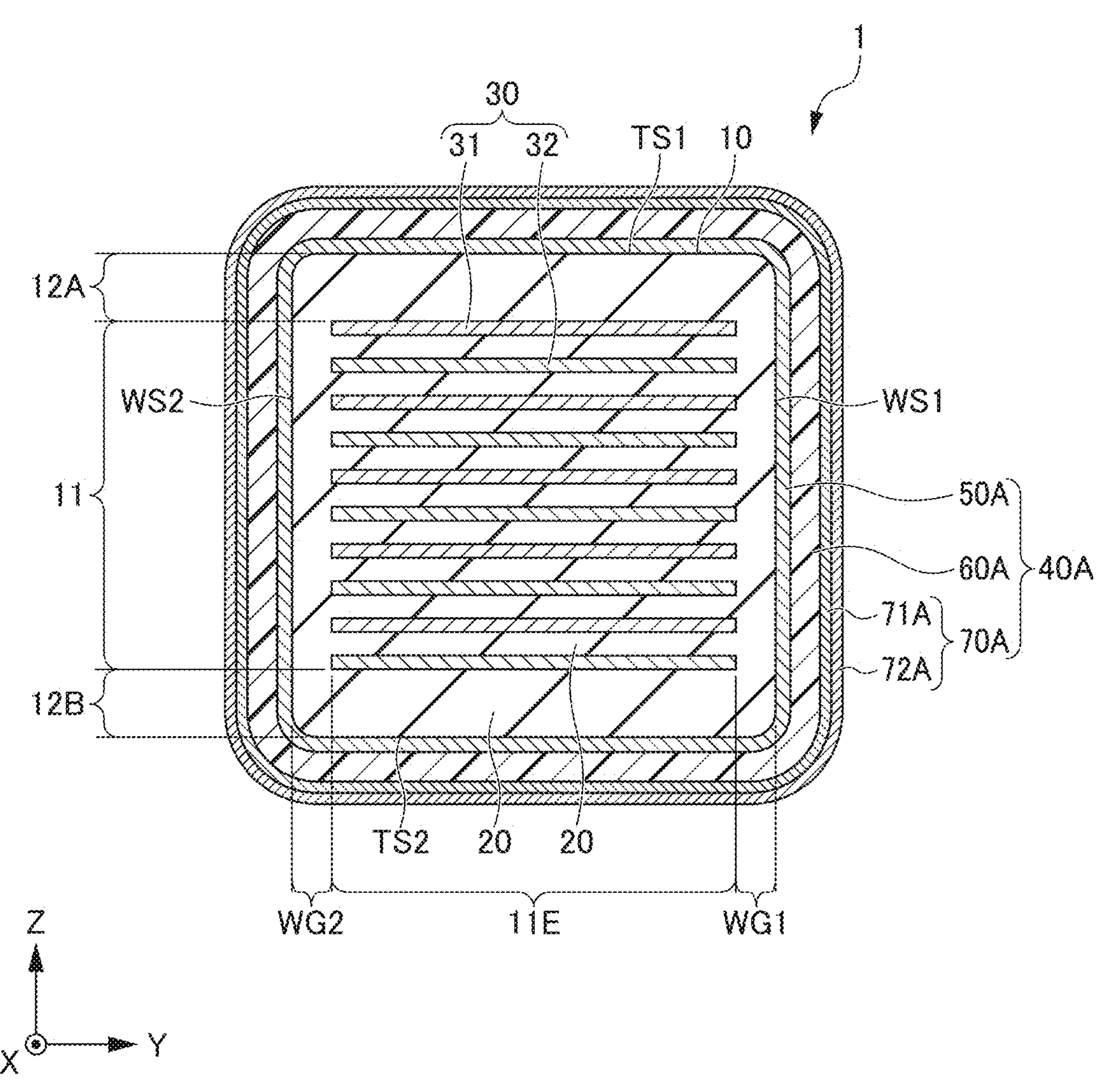
FIG. 3 is a cross-sectional view taken along the line III-III of the multilayer ceramic capacitor of FIG. 2.
Figure 4:
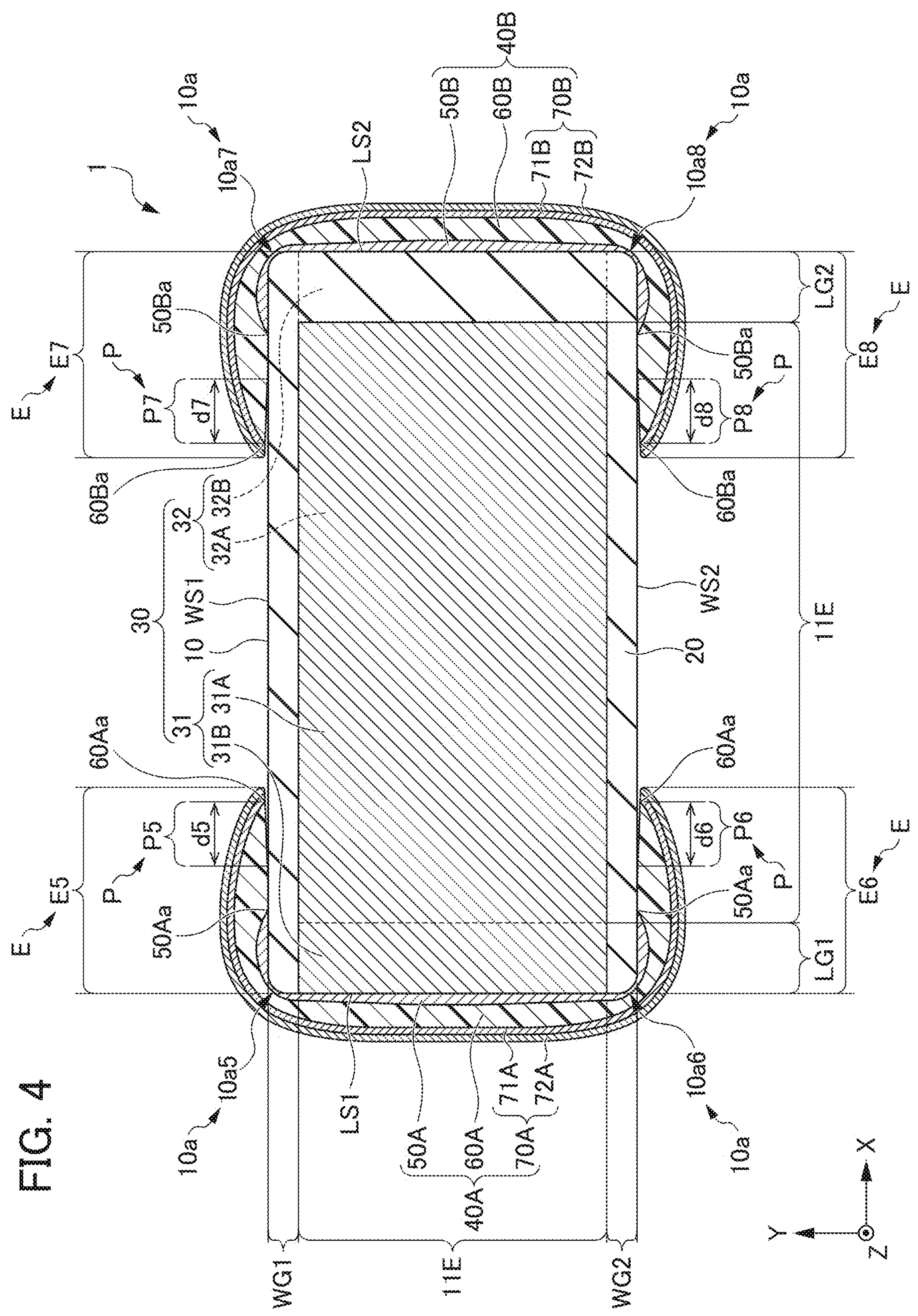
FIG. 4 is a cross-sectional view taken along the line IV-IV of the multilayer ceramic capacitor of FIG. 2.

Hereinafter, a multilayer ceramic capacitor 1 functioning as a multilayer ceramic electronic component according to an example embodiment of the present invention will be described with reference to FIGS. 1 to 4. FIG. 1 is an external perspective view of a multilayer ceramic capacitor 1 of the present example embodiment. FIG. 2 is a cross-sectional view of the multilayer ceramic capacitor 1 taken along the line II-II of FIG. 1. FIG. 3 is a cross-sectional view of the multilayer ceramic capacitor 1 taken along the line III-III of FIG. 2. FIG. 4 is a cross-sectional view of the multilayer ceramic capacitor 1 taken along the line IV-IV of FIG. 2.

The multilayer ceramic capacitor 1 includes a multilayer body 10 and external electrodes 40.

FIGS. 1 to 4 each show an XYZ orthogonal coordinate system. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination (stacking) direction T as the height direction of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIG. 4 is also referred to as an LW cross section.

As shown in FIGS. 1 to 4, the multilayer body 10 includes a first main surface TS1 and a second main surface TS2 which are opposed to each other in the lamination direction T, a first lateral surface WS1 and a second lateral surface WS2 which are opposed to each other in the width direction W orthogonal or substantially orthogonal to the lamination direction T, and a first end surface LS1 and a second end surface LS2 which are opposed to each other in the length direction L orthogonal or substantially orthogonal to the lamination direction T and the width direction W.

As shown in FIG. 1, the multilayer body 10 has a substantially rectangular parallelepiped shape. The dimension in the length direction L of the multilayer body 10 is not necessarily longer than the dimension in the width direction W. The corner portions and ridge portions of the multilayer body 10 are preferably rounded. Each of the corner portions is a portion where the three surfaces of the multilayer body intersect, and each of the ridge portions is a portion where the two surfaces of the multilayer body intersect. In addition, unevenness or the like may be provided on a portion or the entirety of the surface of the multilayer body 10.

The dimension of the multilayer body 10 is not particularly limited, but when the dimension in the length direction L of the multilayer body 10 is defined as an L dimension, the L dimension is preferably about 0.2 mm or more and about 10 mm or less, for example. When the dimension of the multilayer body 10 in the lamination direction T is defined as a T dimension, the T dimension is preferably about 0.1 mm or more and about 10 mm or less, for example. When the dimension of the multilayer body 10 in the width direction W is defined as a W direction, the dimension W is preferably about 0.1 mm or more and about 10 mm or less, for example.

As shown in FIGS. 2 and 3, the multilayer body 10 includes an inner layer portion 11, and a first main surface-side outer layer portion 12A functioning as a first outer layer portion and a second main surface-side outer layer portion 12B functioning as a second outer layer portion sandwiching the inner layer portion 11 in the lamination direction T.

The inner layer portion 11 includes a plurality of dielectric layers 20 functioning as a plurality of ceramic layers and a plurality of internal electrode layers 30 functioning as a plurality of internal conductive layers. The inner layer portion 11 includes an internal electrode layer 30 positioned closest to the first main surface TS1 to an internal electrode layer 30 positioned closest to the second main surface TS2 in the lamination direction T. In the inner layer portion 11, the plurality of internal electrode layers 30 are opposed to each other with each of the plurality of dielectric layers 20 interposed therebetween. The inner layer portion 11 is a portion that substantially functions as a capacitor to generate capacitance.

The plurality of dielectric layers 20 are made of a dielectric material. The dielectric material may be, for example, a dielectric ceramic including components such as $BaTiO_3$, $CaTiO_3$, $SrTiO_3$, or $CaZrO_3$. Further, the dielectric material may be a material obtained by adding subcomponents such as Mn compound, Fe compound, Cr compound, Co compound, or Ni compound to these main components.

The thickness of each of the plurality of dielectric layers 20 is preferably about 0.5 μm or more and about 30 μm or less, for example. The number of laminated dielectric layers 20 is preferably 10 or more and 1500 or less. The number of dielectric layers 20 is a total number of the number of dielectric layers of the inner layer portion 11 and the number of dielectric layers of the first main surface-side outer layer portion 12A and the second main surface-side outer layer portion 12B.

The plurality of internal electrode layers 30 includes first internal electrode layers 31 functioning as a plurality of first internal conductive layers and second internal electrode layers 32 functioning as a plurality of second internal conductive layers. The plurality of first internal electrode layers 31 are provided on the plurality of dielectric layers 20. The plurality of second internal electrode layers 32 are provided on the plurality of dielectric layers 20. The plurality of first internal electrode layers 31 and the plurality of second internal electrode layers 32 are alternately provided with each of the plurality of dielectric layers 20 interposed therebetween in the lamination direction T of the multilayer body 10. One of the first internal electrode layers 31 and one of the second internal electrode layers 32 sandwich one of the dielectric layers 20.

Each of the plurality of first internal electrode layers 31 includes a first counter portion 31A opposed to each of the plurality of second internal electrode layers 32, and a first extension portion 31B extending from the first counter portion 31A toward the first end surface LS1. The first extension portion 31B is exposed at the first end surface LS1.

Each of the plurality of second internal electrode layers 32 includes a second counter portion 32A opposed to each of the plurality of first internal electrode layers 31, and a second extension portion 32B extending from the second counter portion 32A toward the second end surface LS2. The second extension portion 32B is exposed at the second end surface LS2.

In the present example embodiment, the first counter portion 31A and the second counter portion 32A are opposed to each other with the dielectric layer 20 interposed therebetween, such that a capacitance is generated, and the characteristics of the capacitor are developed.

The shapes of each of the first counter portions 31A and each of the second counter portions 32A are not particularly limited, but are preferably rectangular. However, each of the corner portions of the rectangular shape may be rounded, or each of the corner portions of the rectangular shape may include an oblique portion. The shapes of each of the plurality of first extension portions 31B and each of the plurality of second extension portions 32B are not particularly limited, but are preferably rectangular. However, each of the corner portions of the rectangular shape may be rounded, or each of the corner portions of the rectangular shape may include an oblique portion.

The dimension of each of the plurality of first counter portions 31A in the width direction W and the dimension of each of the plurality of first extension portions 31B in the width direction W may be the same, or either one of them may be smaller. The dimension of each of the plurality of second counter portions 32A in the width direction W and the dimension of each of the plurality of second extension portions 32B in the width direction W may be the same, or either one of them may be smaller.

Each of the plurality of first internal electrode layers 31 and each of the plurality of second internal electrode layers 32 are made of an appropriate electrically conductive material such as a metal such as Ni, Cu, Ag, Pd, or Au, or an alloy including at least one of these metals. When an alloy is used, each of the plurality of first internal electrode layers 31 and each of the plurality of second internal electrode layers 32 may be made of, for example, an Ag—Pd alloy.

Each of the thicknesses of the plurality of first internal electrode layers 31 and the plurality of second internal electrode layers 32 are preferably, for example, about 0.2 μm or more and 2.0 μm or less. The total number of the plurality of first internal electrode layers 31 and the plurality of second internal electrode layers 32 is preferably 10 or more and 1500 or less.

The first main surface-side outer layer portion 12A is positioned adjacent to the first main surface TS1 of the multilayer body 10. The first main surface-side outer layer portion 12A is an aggregate of a plurality of dielectric layers 20 positioned between the first main surface TS1 and the internal electrode layer 30 closest to the first main surface TS1. The dielectric layers 20 in the first main surface-side outer layer portion 12A may be the same as the dielectric layers 20 in the inner layer portion 11, or may be dielectric layers made of a different material.

The second main surface-side outer layer portion 12B is positioned adjacent to the second main surface TS2 of the multilayer body 10. The second main surface-side outer layer portion 12B is an aggregate of a plurality of dielectric layers 20 positioned between the second main surface TS2 and the internal electrode layer 30 closest to the second main surface TS2. The dielectric layers 20 in the second main surface-side outer layer portion 12B may be the same as the dielectric layers 20 in the inner layer portion 11, or may be a dielectric layer made of a different material.

The multilayer body 10 includes a counter electrode portion 11E. The counter electrode portion 11E is a portion where the first counter portions 31A of the first internal electrode layers 31 and the second counter portions 32A of the second internal electrode layers 32 are opposed to each other. The counter electrode portion 11E is a portion of the inner layer portion 11. FIG. 4 shows the range in the width direction W and the length direction L of the counter electrode portion 11E. The counter electrode portion 11E is also referred to as a capacitor effective portion.

The multilayer body 10 includes lateral surface-side outer layer portions. The lateral surface-side outer layer portion includes a first lateral surface-side outer layer portion WG1 and a second lateral surface-side outer layer portion WG2. The first lateral surface-side outer layer portion WG1 is a portion including the dielectric layers 20 positioned between the counter electrode portion 11E and the first lateral surface WS1. The second lateral surface-side outer layer portion WG2 is a portion including the dielectric layers 20 positioned between the counter electrode portion 11E and the second lateral surface WS2. FIGS. 3 and 4 each show the ranges in the width direction W of the first lateral surface-side outer layer portion WG1 and the second lateral surface-side outer layer portion WG2. The lateral surface-side outer layer portions are also each referred to as a W gap or a side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layers 20 positioned between the counter electrode portion 11E and the first end surface LS1. The second end surface-side outer layer portion LG2 is a portion including the dielectric layers 20 positioned between the counter electrode portion 11E and the second end surface LS2. FIGS. 2 and 4 each show a range in the length direction L of the first end surface-side outer layer portion LG1 and the second end surface-side outer layer portion LG2. The end surface-side outer layer portions are also each referred to as an L gap or an end gap.

The external electrodes 40 include a first external electrode 40A on and adjacent to the first end surface LS1 and a second external electrode 40B on and adjacent to the second end surface LS2.

The first external electrode 40A is provided on the first end surface LS1. The first external electrode 40A is connected to the first internal electrode layers 31. The first external electrode 40A is provided on a portion of the first main surface TS1 and a portion of the second main surface TS2. In the present example embodiment, the first external electrode 40A extends from the first end surface LS1 to a portion of the first main surface TS1 and a portion of the second main surface TS2, and a portion of the first lateral surface WS1 and a portion of the second lateral surface WS2.

The second external electrode 40B is provided on the second end surface LS2. The second external electrode 40B is connected to the second internal electrode layers 32. The second external electrode 40B is provided on a portion of the first main surface TS1 and a portion of the second main surface TS2. In the present example embodiment, the second external electrode 40B extends from the second end surface LS2 to a portion of the first main surface TS1 and a portion of the second main surface TS2, and a portion of the first lateral surface WS1 and a portion of the second lateral surface WS2.

As described above, in the multilayer body 10, the first counter portions 31A of the first internal electrode layers 31 and the second counter portions 32A of the second internal electrode layers 32 are opposed to each other with each of the dielectric layers 20 interposed therebetween, such that a capacitance is generated. Therefore, the characteristic of the capacitor is developed between the first external electrode 40A to which the first internal electrode layers 31 are connected and the second external electrode 40B to which the second internal electrode layers 32 are connected.

The first external electrode 40A includes a first base electrode layer 50A including a metal component, a first electrically conductive resin layer 60A provided on the first base electrode layer 50A, and a first plated layer 70A provided on the first electrically conductive resin layer 60A. The first plated layer 70A may include a two-layer structure including a first Ni plated layer 71A functioning as a lower plated layer and a first Sn plated layer 72A functioning as an upper plated layer.

The second external electrode 40B includes a second base electrode layer 50B including a metal component, a second electrically conductive resin layer 60B provided on the second base electrode layer 50B, and a second plated layer 70B provided on the second electrically conductive resin layer 60B. The second plated layer 70B may include a second Ni plated layer 71B functioning as a lower plated layer and a second Sn plated layer 72B functioning as an upper plated layer.

Here, the basic configuration of the respective layers of the first external electrode 40A and the second external electrode 40B are the same. The first external electrode 40A and the second external electrode 40B are substantially plane symmetrical with respect to the LW cross section in the middle in the length direction L of the multilayer ceramic capacitor 1. Therefore, in a case where it is not necessary to particularly distinguish between the first external electrode 40A and the second external electrode 40B, the first external electrode 40A and the second external electrode 40B may be collectively referred to as an external electrode 40. In a case where there is no need to particularly distinguish between the first base electrode layer 50A and the second base electrode layer 50B, the first base electrode layer 50A and the second base electrode layer 50B may be collectively referred to as a base electrode layer 50. In a case where it is not necessary to particularly distinguish between the first electrically conductive resin layer 60A and the second electrically conductive resin layer 60B, the first electrically conductive resin layer 60A and the second electrically conductive resin layer 60B may be collectively referred to as an electrically conductive resin layer 60. In a case where it is not necessary to particularly distinguish between the first plated layer 70A and the second plated layer 70B, the first plated layer 70A and the second plated layer 70B may be collectively referred to as a plated layer 70. In a case where it is not necessary to particularly distinguish between the first Ni plated layer 71A and the second Ni plated layer 71B, the first Ni plated layer 71A and the second Ni plated layer 71B may be collectively referred to as a Ni plated layer 71. In a case where it is not necessary to particularly distinguish between the first Sn plated layer 72A and the second Sn plated layer 72B, the first Sn plated layer 72A and the second Sn plated layer 72B may be collectively referred to as the Sn plated layer 72. When it is not necessary to particularly distinguish between the first main surface TS1 and the second main surface TS2, the first main surface TS1 and the second main surface TS2 may be collectively referred to as a main surface TS. When it is not necessary to particularly distinguish between the first lateral surface WS1 and the second lateral surface WS2, the first lateral surface WS1 and the second lateral surface WS2 may be collectively referred to as a lateral surface WS. When it is not necessary to particularly distinguish between the first end surface LS1 and the second end surface LS2, the first end surface LS1 and the second end surface LS2 may be collectively referred to as an end surface LS.

The base electrode layer 50 includes a first base electrode layer 50A and a second base electrode layer 50B.

The first base electrode layer 50A is provided on the first end surface LS1. The first base electrode layer 50A is connected to the first internal electrode layers 31. In the present example embodiment, the first base electrode layer 50A extends from the first end surface LS1 to a portion of the first main surface TS1 and a portion of the second main surface TS2, and to a portion of the first lateral surface WS1 and a portion of the second lateral surface WS2.

The second base electrode layer 50B is provided on the second end surface LS2. The second base electrode layer 50B is connected to the second internal electrode layers 32. In the present example embodiment, the second base electrode layer 50B extends from the second end surface LS2 to a portion of the first main surface TS1 and a portion of the second main surface TS2, and to a portion of the first lateral surface WS1 and a portion of the second lateral surface WS2.

The first base electrode layer 50A and the second base electrode layer 50B of the present example embodiment are fired layers. The fired layers each preferably includes a metal component and either or both of a glass component and a ceramic component. Thus, the adhesion between the multilayer body 10 and the base electrode layer can be improved. The metal component includes, for example, at least one selected from Cu, Ni, Ag, Pd, Ag—Pd alloy, Au, and the like. The glass component includes, for example, at least one selected from B, Si, Ba, Mg, Al, Li, and the like. When a glass component is present, sintering of the metal component in the base electrode layer can be promoted and advanced. The ceramic component may be a ceramic material of the same kind as the dielectric layer 20 or a ceramic material of a different kind. The ceramic component includes, for example, at least one selected from $BaTiO_3$, $CaTiO_3$, $(Ba, Ca)TiO_3$, $SrTiO_3$, $CaZrO_3$, and the like.

The fired layer is formed, for example, by coating a multilayer body with an electrically conductive paste including glass and metal and firing the resulting product. The fired layer may be obtained by simultaneously firing a multilayer chip having internal electrodes and dielectric layers and an electrically conductive paste applied to the multilayer chip, or may be obtained by firing a multilayer chip having internal electrodes and dielectric layers to obtain a multilayer body, and then firing the multilayer body by applying the electrically conductive paste to the multilayer body. In a case where the multilayer chip having the internal electrodes and the dielectric layers, and the electrically conductive paste applied to the multilayer chip are simultaneously fired, the fired layer including a ceramic material instead of the glass component is preferably formed. In this case, it is particularly preferable to use the same kind of ceramic material as the dielectric layer 20 as the ceramic material to be added. The fired layer may include a plurality of layers.

The thickness in the length direction of the first base electrode layer 50A positioned at the first end surface LS1 is preferably, for example, about 2 μm or more and about 220 μm or less in the middle of the first base electrode layer 50A in the lamination direction T and the width direction W.

The thickness in the length direction of the second base electrode layer 50B positioned at the second end surface LS2 is preferably, for example, about 2 μm or more and about 220 μm or less in the middle of the second base electrode layer 50B in the lamination direction T and the width direction W.

In a case where the first base electrode layer 50A is provided also on a portion of at least one surface of the first main surface TS1 or the second main surface TS2, the thickness of the first base electrode layer 50A provided on this portion in the lamination direction is preferably, for example, about 4 μm or more and about 40 μm or less in the middle in the length direction L and the width direction W of the first base electrode layer 50A provided on this portion.

In a case where the first base electrode layer 50A is provided also on a portion of at least one of the first lateral surface WS1 and the second lateral surface WS2, the thickness in the width direction of the first base electrode layer 50A provided on this portion is preferably, for example, about 4 μm or more and about 40 μm or less in the middle in the length direction L and the lamination direction T of the first base electrode layer 50A provided on this portion.

In a case where the second base electrode layer 50B is provided on a portion of at least one surface of the first main surface TS1 or the second main surface TS2, the thickness of the second base electrode layer 50B provided on this portion in the lamination direction is preferably, for example, about 4 μm or more and about 40 μm or less in the middle in the length direction L and the width direction W of the second base electrode layer 50B provided on this portion.

In a case where the second base electrode layer 50B is provided also on a portion of at least one of the first lateral surface WS1 and the second lateral surface WS2, the thickness in the width direction of the second base electrode layer 50B provided on this portion is preferably, for example, about 4 μm or more and about 40 μm or less in the middle in the length direction L and the lamination direction T of the second base electrode layer 50B3 provided on this portion.

Each of the external electrodes 40 includes an electrically conductive resin layer 60 including a resin component and a metal component provided on the base electrode layer 50.

The electrically conductive resin layer 60 includes a first electrically conductive resin layer 60A and a second electrically conductive resin layer 60B.

The first electrically conductive resin layer 60A covers the first base electrode layer 50A. In the present example embodiment, the first electrically conductive resin layer 60A extends from the first end surface LS1 to a portion of the first main surface TS1 and a portion of the second main surface TS2, and a portion of the first lateral surface WS1 and a portion of the second lateral surface WS2. The second electrically conductive resin layer 60B is provided so as to cover the second base electrode layer 50B. In the present example embodiment, the second electrically conductive resin layer 60B extends from the second end surface LS2 to a portion of the first main surface TS1 and a portion of the second main surface TS2, and a portion of the first lateral surface WS1 and a portion of the second lateral surface WS2. Here, the dimension in the length direction L on the first main surface TS1 and the second main surface TS2 of the first electrically conductive resin layer 60A is longer than the dimension in the length direction L on the first main surface TS1 and the second main surface TS2 of the first base electrode layer 50A. The dimension of the second electrically conductive resin layer 60B in the length direction L on the first main surface TS1 and the second main surface TS2 is longer than the dimension of the second base electrode layer 50B in the length direction L on the first main surface TS1 and the second main surface TS2.

The thickness in the length direction of the first electrically conductive resin layer 60A positioned adjacent to the first end surface LS1 is preferably, for example, about 5 μm or more and about 200 μm or less in the middle of the first electrically conductive resin layer 60A in the lamination direction T and the width direction W.

The thickness in the length direction of the second electrically conductive resin layer 60B positioned adjacent to the second end surface LS2 is preferably, for example, about 5 μm or more and about 200 μm or less in the middle of the second electrically conductive resin layer 60B in the lamination direction T and the width direction W.

In a case where the first electrically conductive resin layer 60A is also provided on a portion of the first main surface TS1 and a portion of the second main surface TS2, the thickness in the lamination direction T of the first electrically conductive resin layer 60A provided on this portion is preferably, for example, about 5 μm or more and about 200 μm or less in the middle of the first electrically conductive resin layer 60A provided on this portion in the length direction L and the width direction W.

In a case where the first electrically conductive resin layer 60A is also provided on a portion of the first lateral surface WS1 and a portion of the second lateral surface WS2, the thickness in the width direction W of the first electrically conductive resin layer 60A provided on this portion is preferably, for example, about 5 μm or more and about 200 μm or less in the middle of the first electrically conductive resin layer 60A provided on this portion in the length direction L and the lamination direction T.

In a case where the second electrically conductive resin layer 60B is also provided on a portion of the first main surface TS1 and a portion of the second main surface TS2, the thickness of the second electrically conductive resin layer 60B provided on this portion in the lamination direction T is preferably, for example, about 5 μm or more and about 200 μm or less in the middle of the second electrically conductive resin layer 60B provided on this portion in the length direction L and the width direction w.

In a case where the second electrically conductive resin layer 60B is also provided on a portion of the first lateral surface WS1 and a portion of the second lateral surface WS2, the thickness in the width direction W of the second electrically conductive resin layer 60B provided on this portion is preferably, for example, about 5 μm or more and about 200 μm or less in the middle of the second electrically conductive resin layer 60B provided on this portion in the length direction L and the lamination direction T.

The electrically conductive resin layer 60 is provided on the base electrode layer 50. The plated layer 70 covers the electrically conductive resin layer 60. The plated layer 70 includes a Ni plated layer 71 and a Sn plated layer 72.

The electrically conductive resin layer 60 includes a resin portion serving as a resin component and an electrically conductive filler serving as a filler powder dispersed in the resin portion.

The resin portion of the electrically conductive resin layer 60 may include, for example, at least one of various known thermosetting resins such as epoxy resin, phenoxy resin, phenol resin, urethane resin, silicone resin, or polyimide resin. Among them, epoxy resins excelling in heat resistance, moisture resistance, adhesiveness and the like are the most suitable resins. The resin portion of the electrically conductive resin layer 60 preferably includes a curing agent together with the thermosetting resin. When an epoxy resin is used as the base resin, the curing agent of the epoxy resin may be any of various known compounds such as phenolic, amine-based, acid anhydride-based, imidazole-based, active ester-based, or amideimide-based compounds.

Since the electrically conductive resin layer 60 includes such a resin portion, it is more flexible than, for example, the base electrode layer 50 made of a plated film or a fired product of a metal component and a glass component. Therefore, even when a physical impact or shock caused by thermal cycling is applied to the multilayer ceramic capacitor 1, the electrically conductive resin layer 60 functions as a buffer layer. Accordingly, it is possible for the electrically conductive resin layer 60 to reduce or prevent the generation of cracks in the multilayer ceramic capacitor 1.

The electrically conductive filler is dispersed in the resin portion in a uniform or substantially uniform distribution. The electrically conductive filler mainly maintains the conductivity of the electrically conductive resin layer 60. Specifically, when the plurality of electrically conductive fillers are brought into contact with each other, an electric current-carrying path is provided inside the electrically conductive resin layer 60, such that the base electrode layer 50 and the plated layer 70 are electrically connected to each other.

The metal of the electrically conductive filler may be Ag alone, an alloy including Ag, or metal powder including Ag coating on the surface of the metal powder. Ag is suitable for electrode materials because of its lowest specific resistance among metals. Since Ag is a noble metal, it hardly oxidizes and the weather resistance is high. Therefore, the metal powder of Ag is suitable as the electrically conductive filler. When a metal powder coated with Ag is used, Cu, Ni, Sn, Bi or an alloy powder including them is preferably used as the metal powder.

Further, the electrically conductive filler may be formed by subjecting Cu and Ni to an oxidation preventing treatment. The electrically conductive filler may be a metal powder obtained by coating the surface of the metal powder with Sn, Ni, or Cu. When a metal powder coated with Sn, Ni, or Cu is used, the metal powder is preferably Ag, Cu, Ni, Sn, or Bi or an alloy powder thereof. The electrically conductive filler more preferably includes Cu particles as a core. Further, it is more preferable that at least a portion of the surface of each of the Cu particles is coated with a Cu—Ag alloy of Cu and Ag. At least a portion of the surface of each of the Cu particles may be coated with Ag. With such a configuration, the affinity with the Ni plating is improved, and the electrical characteristics are improved.

The shape of the electrically conductive filler is not particularly limited. The electrically conductive filler may have a spherical shape, a flat shape, or the like. It is preferable to use a combination of metal powders having a spherical shape and a flat shape. In other words, the electrically conductive filler serving as the filler powder includes flat powder or spherical powder.

The average particle diameter of the electrically conductive filler may be, for example, about 0.3 μm or more and about 10 μm or less.

The average particle diameter of the electrically conductive filler included in the electrically conductive resin layer 60 is calculated by using a laser diffraction particle size measurement method based on ISO 13320 regardless of the shape of the electrically conductive filler, regardless of the shape of the electrically conductive filler.

The plated layer 70 includes a first plated layer 70A and a second plated layer 70B.

The first plated layer 70A covers the first electrically conductive resin layer 60A. In the present example embodiment, the first plated layer 70A extends from the first end surface LS1 to a portion of the first main surface TS1 and a portion of the second main surface TS2, and to a portion of the first lateral surface WS1 and a portion of the second lateral surface WS2.

The second plated layer 70B covers the second electrically conductive resin layer 60B. In the present example embodiment, the second plated layer 70B extends from the first end surface LS1 to a portion of the first main surface TS1 and a portion of the second main surface TS2, and to a portion of the first lateral surface WS1 and a portion of the second lateral surface WS2.

The plated layer 70 preferably has a two-layer structure of a Ni plated layer 71 and a Sn plated layer 72. The first Sn plated layer 72A is preferably provided on the first Ni plated layer 71A, and the second Sn plated layer 72B is preferably provided on the second Ni plated layer 71B. The Ni plated layer 71 prevents the base electrode layer 50 and the electrically conductive resin layer 60 from being eroded by solder when the multilayer ceramic capacitor 1 is mounted. The Sn plated layer 72 improves wettability of solder when mounting the multilayer ceramic capacitor 1. This facilitates mounting of the multilayer ceramic capacitor 1.

The thicknesses of the first Ni plated layer 71A and the first Sn plated layer 72A are preferably about 5 μm or more and about 15 μm or less, for example.

The thicknesses of the second Ni plated layer 71B and the second Sn plated layer 72B are preferably about 5 μm or more and about 15 μm or less, for example.

Figure 5:
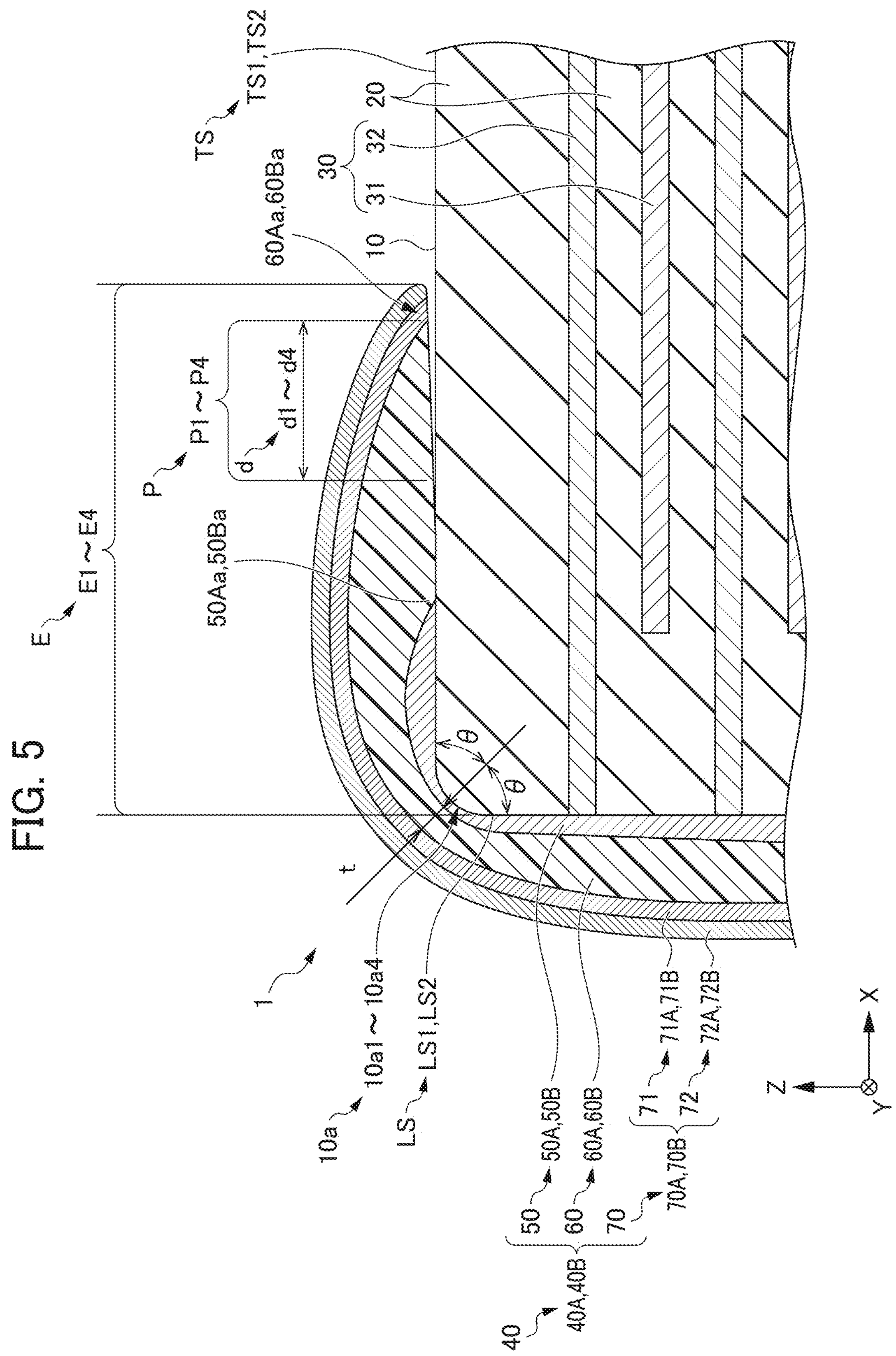
FIG. 5 is an enlarged view of a portion V of the multilayer ceramic capacitor shown in FIG. 2, and is a schematic view for explaining in detail a configuration of a ridge portion of the multilayer ceramic capacitor.

FIG. 5 is an enlarged view of a portion V of the multilayer ceramic capacitor 1 shown in FIG. 2, and is a schematic view for explaining in detail the configuration of a ridge portion 10*a* of the multilayer ceramic capacitor 1 described later.

Here, the basic configuration of four ridge portions 10*a*1 to 10*a*4 of the multilayer body 10 shown in FIG. 2 are the same, and the basic configuration of the four extending portions E1 to E4 of the external electrode 40 are the same. Therefore, four regions will be described using FIG. 5 as a representative diagram. As described above, since the first external electrode 40A and the second external electrode 40B have the same basic configuration, they are collectively shown as the external electrode 40 in FIG. 5. The same applies to other layers of the first external electrode 40A and the second external electrode 40B.

As illustrated in FIG. 5, the external electrode 40 includes a base electrode layer 50, an electrically conductive resin layer 60 provided on the base electrode layer 50, and a plated layer 70 provided on the electrically conductive resin layer 60. The external electrode 40 includes an extending portion E that extends to a portion of the main surface TS. The multilayer body 10 includes a ridge portion 10*a* at a portion where the end surface LS and the main surface TS intersect with each other. The electrically conductive resin layer 60 is provided on the ridge portion 10*a* of the multilayer body 10.

Each of the first external electrode 40A and the second external electrode 40B includes the extending portion E that extends to a portion of the first main surface TS1 and a portion of the second main surface TS2. In the present example embodiment, each of the first external electrode 40A and the second external electrode 40B further includes the extending portion E that extends to a portion of the first lateral surface WS1 and a portion of the second lateral surface WS2.

For example, as illustrated in FIGS. 2, 4, and 5, the extending portion E according to the present example embodiment includes a first extending portion E1, a second extending portion E2, a third extending portion E3, a fourth extending portion E4, a fifth extending portion E5, a sixth extending portion E6, a seventh extending portion E7, and an eighth extending portion E8.

As illustrated in FIGS. 2 and 5, the first extending portion E1 is a portion of the first external electrode 40A and extends to a portion of the first main surface TS1. As illustrated in FIGS. 2 and 5, the second extending portion E2 is a portion of the first external electrode 40A and extends to a portion of the second main surface TS2.

As illustrated in FIGS. 2 and 5, the third extending portion E3 is a portion of the second external electrode 40B and extends to a portion of the first main surface TS1. As illustrated in FIGS. 2 and 5, the fourth extending portion E4 is a portion of the second external electrode 40B and extends to a portion of the second main surface TS2.

As illustrated in FIG. 4, the fifth extending portion E5 is a portion of the first external electrode 40A and extends to a portion of the first lateral surface WS1. As illustrated in FIG. 4, the sixth extending portion E6 is a portion of the first external electrode 40A and extends to a portion of the second lateral surface WS2.

As illustrated in FIG. 4, the seventh extending portion E7 is a portion of the second external electrode 40B and extends to a portion of the first lateral surface WS1. As illustrated in FIG. 4, the eighth extending portion E8 is a portion of the second external electrode 40B and extends to a portion of the second lateral surface WS2.

The configuration of the extending portion E is not limited thereto. For example, in the first external electrode 40A and the second external electrode 40B, the extending portion E may be provided at least on the first main surface TS1 and the second main surface TS2.

The multilayer body 10 includes the ridge portion 10*a* at a portion where the first end surface LS1 and the first main surface TS1 intersect, a portion where the first end surface LS1 and the second main surface TS2 intersect, a portion where the second end surface LS2 and the first main surface TS1 intersect, and a portion where the second end surface LS2 and the second main surface TS2 intersect. In the present example embodiment, the multilayer body 10 also includes the ridge portion 10*a* at a portion where the first end surface LS1 and the first lateral surface WS1 intersect, a portion where the first end surface LS1 and the second lateral surface WS2 intersect, a portion where the second end surface LS2 and the first lateral surface WS1 intersect, and a portion where the second end surface LS2 and the second lateral surface WS2 intersect.

For example, the ridge portion 10*a* according to the present example embodiment includes a first ridge portion 10*a*1, a second ridge portion 10*a*2, a third ridge portion 10*a*3, a fourth ridge portion 10*a*4, a fifth ridge portion 10*a*5, a sixth ridge portion 10*a*6, a seventh ridge portion 10*a*7, and an eighth ridge portion 10*a*8.

As illustrated in FIGS. 2 and 5, the first ridge portion 10*a*1 is a portion where the first end surface LS1 and the first main surface TS1 intersect with each other. As illustrated in FIGS. 2 and 5, the second ridge portion 10*a*2 is a portion where the first end surface LS1 and the second main surface TS2 intersect with each other.

As illustrated in FIGS. 2 and 5, the third ridge portion 10*a*3 is a portion where the second end surface LS2 and the first main surface TS1 intersect with each other. As illustrated in FIGS. 2 and 5, the fourth ridge portion 10*a*4 is a portion where the second end surface LS2 and the second main surface TS2 intersect with each other.

As illustrated in FIG. 4, the fifth ridge portion 10*a*5 is a portion where the first end surface LS1 and the first lateral surface WS1 intersect with each other. As illustrated in FIG. 4, the sixth ridge portion 10*a*6 is a portion where the first end surface LS1 and the second lateral surface WS2 intersect with each other.

As illustrated in FIG. 4, the seventh ridge portion 10*a*7 is a portion where the second end surface LS2 and the first lateral surface WS1 intersect with each other. As illustrated in FIG. 4, the eighth ridge portion 10*a*8 is a portion where the second end surface LS2 and the second lateral surface WS2 intersect with each other.

The electrically conductive resin layer 60 is provided on the ridge portion 10*a* of the multilayer body 10 with the base electrode layer 50 interposed therebetween. That is, the electrically conductive resin layer 60 is provided on the ridge portion 10*a* of the multilayer body 10 and sandwiched between the base electrode layer 50 and the plated layer 70. The thickness of the electrically conductive resin layer 60 at the ridge portion 10*a* of the multilayer body 10 is thinner than the thickness of the electrically conductive resin layer 60 at the other portions, that is, the thickness of the electrically conductive resin layer 60 at the end surface LS of the multilayer body 10, the main surface TS of the multilayer body 10, and the lateral surface WS of the multilayer body 10. The film thickness t of the electrically conductive resin layer 60 at the ridge portion 10*a* is preferably about 0.8 μm or more and about 8 μm or less, for example.

In a case where the plated layer 70 is provided so as to straddle the ridge portion 10*a*, the bending occurring in the main surface TS or the lateral surface WS of the external electrode 40 may propagate to the end surface LS of the multilayer body 10. However, when the electrically conductive resin layer 60 is provided on the ridge portion 10*a*, the flexibility of the electrically conductive resin layer 60 can reduce or prevent the propagation of the bending occurring in the main surface TS or the lateral surface WS of the external electrode 40 to the end surface LS of the multilayer body 10.

As illustrated in FIGS. 2 and 5, the first electrically conductive resin layer 60A is provided on the first ridge portion 10*a*1 of the multilayer body 10 according to the present example embodiment. As illustrated in FIGS. 2 and 5, the first electrically conductive resin layer 60A is provided on the second ridge portion 10*a*2 of the multilayer body 10 according to the present example embodiment. As illustrated in FIGS. 2 and 5, the second electrically conductive resin layer 60B is provided on the third ridge portion 10*a*3 of the multilayer body 10 according to the present example embodiment. As illustrated in FIGS. 2 and 5, the second electrically conductive resin layer 60B is provided on the fourth ridge portion 10*a*4 of the multilayer body 10 according to the present example embodiment.

As illustrated in FIG. 4, the first electrically conductive resin layer 60A is provided on the fifth ridge portion 10*a*5 of the multilayer body 10 according to the present example embodiment. As illustrated in FIG. 4, the first electrically conductive resin layer 60A is provided on the sixth ridge portion 10*a*6 of the multilayer body 10 according to the present example embodiment. As shown in FIG. 4, the second electrically conductive resin layer 60B is provided on the seventh ridge portion 10*a*7 of the multilayer body 10 according to the present example embodiment. As illustrated in FIG. 4, the second electrically conductive resin layer 60B is provided on the eighth ridge portion 10*a*8 of the multilayer body 10 according to the present example embodiment.

The electrically conductive resin layer 60 includes a peeling region P separated from the multilayer body 10 in at least one extending portion E. The peeling region P is provided in a region from an end (60Aa, 60Ba) of the electrically conductive resin layer 60 adjacent to the middle of the multilayer body in the length direction L to an end (50Aa, 50Ba) of the base electrode layer 50 adjacent to the middle of the multilayer body in the length direction L. That is, the peeling region P does not reach the end (50Aa, 50Ba) of the base electrode layer 50 adjacent to the middle of the multilayer body in the length direction L. The dimension of the peeling region P in the length direction L is preferably about 5 μm or more, for example. Although a particularly enhanced effect can be obtained by providing the peeling region P on the mounting surface, the present invention is not limited thereto.

At least one of the first electrically conductive resin layer 60A and the second electrically conductive resin layer 60B includes the peeling region P separated from the multilayer body 10 on either surface of the first main surface TS1 and the second main surface TS2 in contact with the ridge portion 10*a*.

For example, as illustrated in FIGS. 2 and 5, the first electrically conductive resin layer 60A according to the present example embodiment includes a first peeling region P1 separated from the multilayer body 10 on the first main surface TS1 in contact with the first ridge portion 10*al*. As illustrated in FIGS. 2 and 5, the first electrically conductive resin layer 60A according to the present example embodiment includes a second peeling region P2 separated from the multilayer body 10 on the second main surface TS2 in contact with the second ridge portion 10*a*2.

As illustrated in FIGS. 2 and 5, the second electrically conductive resin layer 60B according to the present example embodiment includes a third peeling region P3 separated from the multilayer body 10 on the first main surface TS1 in contact with the third ridge portion 10*a*3. As illustrated in FIGS. 2 and 5, the second electrically conductive resin layer 60B according to the present example embodiment includes a fourth peeling region P4 separated from the multilayer body 10 on the second main surface TS2 in contact with the fourth ridge portion 10*a*4.

For example, as illustrated in FIG. 4, the first electrically conductive resin layer 60A according to the present example embodiment includes a fifth peeling region P5 separated from the multilayer body 10 on the first lateral surface WS1 in contact with the fifth ridge portion 10*a*5. As illustrated in FIG. 4, the first electrically conductive resin layer 60A according to the present example embodiment includes a sixth peeling region P6 separated from the multilayer body 10 on the second lateral surface WS2 in contact with the sixth ridge portion 10*a*6.

As illustrated in FIG. 4, the second electrically conductive resin layer 60B according to the present example embodiment includes a seventh peeling region P7 separated from the multilayer body 10 on the first main surface TS1 in contact with the seventh ridge portion 10*a*7. As illustrated in FIG. 4, the second electrically conductive resin layer 60B according to the present example embodiment includes an eighth peeling region P8 separated from the multilayer body 10 on the second main surface TS2 in contact with the eighth ridge portion 10*a*8.

That is, the peeling region P according to the present example embodiment includes the first peeling region P1, the second peeling region P2, the third peeling region P3, the fourth peeling region P4, the fifth peeling region P5, the sixth peeling region P6, the seventh peeling region P7, and the eighth peeling region P8. The configuration of the peeling region P is not limited thereto. The peeling region P may not be provided at all of the extending portions E in which the first electrically conductive resin layer 60A and the second electrically conductive resin layer 60B extend to the main surface TS and the lateral surface WS. For example, the peeling region P may be provided only at the extending portion E extending to the main surface TS.

For example, the peeling region P may be provided in at least one of the first extending portion E1 in the first main surface TS1 and the second extending portion E2 on the second main surface TS2 of the first external electrode 40A, and at least one of the third extending portion E3 on the first main surface TS1 and the fourth extending portion E4 on the second main surface TS2 of the second external electrode 40B.

In addition, the peeling region P may be provided in the first extending portion E1 on the first main surface TS1 of the first external electrode 40A and the third extending portion E3 on the first main surface TS1 of the second external electrode 40B, or in the second extending portion E2 on the second main surface TS2 of the first external electrode 40A and the fourth extending portion E4 on the second main surface TS2 of the second external electrode 40B.

In addition, the peeling region P may be provided in the first extending portion E1 on the first main surface TS1 and the second extending portion E2 on the second main surface TS2 of the first external electrode 40A, or in the third extending portion E3 on the first main surface TS1 and the fourth extending portion E4 on the second main surface TS2 of the second external electrode 40B.

In addition, the peeling region P may be provided in the first extending portion E1 on the first main surface TS1 and the second extending portion E2 on the second main surface TS2 of the first external electrode 40A, and the third extending portion E3 on the first main surface TS1 and the fourth extending portion E4 on the second main surface TS2 of the second external electrode 40B.

It is preferable that the film thickness of the electrically conductive resin layer on the ridge portion 10*a* at a portion where the end surface LS and the main surface TS of the multilayer body 10 on which the extending portion E including the peeling region P is provided intersect is about 0.8 μm or more and about 8 μm or less, for example. In the present example embodiment, all of the extending portions E include the peeling regions P.

In the present example embodiment, the film thickness of the first electrically conductive resin layer 60A on the first ridge portion 10*a*1 is about 0.8 μm or more and about 8 μm or less, for example. In the present example embodiment, the film thickness of the first electrically conductive resin layer 60A on the second ridge portion 10*a*2 is about 0.8 μm or more and about 8 μm or less, for example.

In the present example embodiment, the film thickness of the second electrically conductive resin layer 60B on the third ridge portion 10*a*3 is about 0.8 μm or more and about 8 μm or less, for example. In the present example embodiment, the film thickness of the second electrically conductive resin layer 60B on the fourth ridge portion 10*a*4 is about 0.8 μm or more and about 8 μm or less, for example.

In the present example embodiment, the film thickness of the first electrically conductive resin layer 60A on the fifth ridge portion 10*a*5 is about 0.8 μm or more and about 8 μm or less, for example. In the present example embodiment, the film thickness of the first electrically conductive resin layer 60A on the sixth ridge portion 10*a*6 is about 0.8 μm or more and about 8 μm or less, for example.

In the present example embodiment, the film thickness of the second electrically conductive resin layer 60B on the seventh ridge portion 10*a*7 is about 0.8 μm or more and about 8 μm or less, for example. In the present example embodiment, the film thickness of the second electrically conductive resin layer 60B on the eighth ridge portion 10*a*8 is about 0.8 μm or more and about 8 μm or less, for example.

Film Thickness Measurement of Electrically Conductive Resin Layer at Ridge Portion Hereinafter, the film thickness measurement of the electrically conductive resin layer 60 on the ridge portion 10*a* will be described with reference to FIG. 5. The film thickness of the electrically conductive resin layer 60 on the ridge portion 10*a* is measured based on observation by a scanning electron microscope (SEM).

The SEM observation for measuring the thickness of the electrically conductive resin layer 60 on the ridge portion 10*a* is performed in an LT cross section parallel or substantially parallel to the first lateral surface WS1 and the second lateral surface WS2 at a position substantially in the middle in the width direction W of the multilayer body 10.

First, in order to expose the LT cross section of the multilayer body 10 of the multilayer ceramic capacitor 1, the substantially middle position of the multilayer body 10 in the width direction W is broken by a nipping device.

Thereafter, the fractured surface is heat-treated at 1000° C. for 30 minutes, and pretreatment is performed so that the electrically conductive resin layer can be easily observed. After the treatment by the above method, the measurement target portion is photographed by SEM at a high magnification of 20,000 times. The thickness is measured by tracing the outer edge of the electrically conductive resin layer from the image photographed by the analysis software.

In the measurement of the thickness of the electrically conductive resin layer 60 on the ridge portion 10*a*, as shown in FIG. 5, a bisector is drawn so as to divide the angle defined by the end surface LS and the main surface TS into two halves at the angle θ. In the present example embodiment, since the angle defined by the end surface LS and the main surface TS is approximately 90°, a bisector is drawn so as to bisect at the angle θ of approximately 45°, for example. The thickness of the electrically conductive resin layer 60 in the direction of the drawn bisector is measured.

The thickness of the electrically conductive resin layer 60 on the ridge portion 10*a* is measured at four points of the ridge portion 10*a*1 of the portion where the first end surface LS1 and the first main surface TS1 intersect, the ridge portion 10*a*2 of the portion where the first end surface LS1 and the second main surface TS2 intersect, the ridge portion 10*a*3 of the portion where the second end surface LS2 and the first main surface TS1 intersect, and the ridge portion 10*a*4 of the portion where the second end surface LS2 and the second main surface TS2 intersect, and the average value thereof is defined as the film thickness t of the electrically conductive resin layer 60 on the ridge portion 10*a* in the present disclosure.

The peeling region P is provided in a region from an end (60Aa, 60Ba) of the electrically conductive resin layer 60 adjacent to the middle of the multilayer body in the length direction L to before an end (50Aa, 50Ba) of the base electrode layer 50 adjacent to the middle of the multilayer body in the length direction L. That is, the peeling region P does not reach the end (50Aa and 50Ba) of the base electrode layer 50 adjacent to the middle of the multilayer body in the length direction L.

The first peeling region P1 according to the present example embodiment is provided between the end 60Aa of the first electrically conductive resin layer 60A adjacent to the middle of the multilayer body in the length direction L and the end 50Aa of the first base electrode layer 50A adjacent to the middle of the multilayer body in the length direction L.

The second peeling region P2 according to the present example embodiment is provided between the end 60Aa of the first electrically conductive resin layer 60A adjacent to the middle of the multilayer body in the length direction L and the end 50Aa of the first base electrode layer 50A adjacent to the middle of the multilayer body in the length direction L.

The third peeling region P3 according to the present example embodiment is provided between the end 60Ba of the second electrically conductive resin layer 60B adjacent to the middle of the multilayer body in the length direction L and the end 50Ba of the second base electrode layer 50B adjacent to the middle of the multilayer body in the length direction L.

The fourth peeling region P4 according to the present example embodiment is provided between the end 60Ba of the second electrically conductive resin layer 60B adjacent to the middle of the multilayer body in the length direction L and the end 50Ba of the second base electrode layer 50B adjacent to the middle of the multilayer body in the length direction L.

The fifth peeling region P5 according to the present example embodiment is provided between the end 60Aa of the first electrically conductive resin layer 60A adjacent to the middle of the multilayer body in the length direction L and the end 50Aa of the first base electrode layer 50A adjacent to the middle of the multilayer body in the length direction L.

The sixth peeling region P6 according to the present example embodiment is provided between the end 60Aa of the first electrically conductive resin layer 60A adjacent to the middle of the multilayer body in the length direction L and the end 50Aa of the first base electrode layer 50A adjacent to the middle of the multilayer body in the length direction L.

The seventh peeling region P7 according to the present example embodiment is provided between the end 60Ba of the second electrically conductive resin layer 60B adjacent to the middle of the multilayer body in the length direction L and the end 50Ba of the second base electrode layer 50B adjacent to the middle of the multilayer body in the length direction L.

The eighth peeling region P8 according to the present example embodiment is provided between the end 60Ba of the second electrically conductive resin layer 60B adjacent to the middle of the multilayer body in the length direction L and the end 50Ba of the second base electrode layer 50B adjacent to the middle of the multilayer body in the length direction L.

The end 50Aa of the first base electrode layer 50A adjacent to the middle of the multilayer body 10 in the length direction L is provided more to the outer side of the multilayer body 10 in the length direction L than any of the first peeling region P1, the second peeling region P2, the fifth peeling region P5, and the sixth peeling region P6 in the length direction L. That is, none of the first peeling region P1, the second peeling region P2, the fifth peeling region P5, and the sixth peeling region P6 reaches the end of the first base electrode layer 50A adjacent to the middle of the multilayer body 10 in the length direction L.

The end 50Ba of the second base electrode layer 50B adjacent to the middle of the multilayer body 10 in the length direction L is provided on the outer side of the multilayer body 10 in the length direction L than any of the third peeling region P3, the fourth peeling region P4, the seventh peeling region P7, and the eighth peeling region P8 in the length direction L. That is, none of the third peeling region P3, the fourth peeling region P4, the seventh peeling region P7, and the eighth peeling region P8 reaches the end of the second base electrode layer 50B adjacent to the middle of the multilayer body 10 in the length direction L.

The dimension d of the peeling region P in the length direction L is about 5 μm or more, for example. The dimension d1 in the length direction L of the first peeling region P1 according to the present example embodiment is about 5 μm or more, for example. The dimension d2 in the length direction L of the second peeling region P2 according to the present example embodiment is about 5 μm or more, for example.

The dimension d3 in the length direction L of the third peeling region P3 according to the present example embodiment is about 5 μm or more, for example. The dimension d4 in the length direction L of the fourth peeling region P4 according to the present example embodiment is about 5 μm or more, for example.

The dimension d5 in the length direction L of the fifth peeling region P5 according to the present example embodiment is about 5 μm or more, for example. The dimension d6 in the length direction L of the sixth peeling region P6 according to the present example embodiment is about 5 μm or more, for example.

The dimension d7 in the length direction L of the seventh peeling region P7 according to the present example embodiment is about 5 μm or more, for example. The dimension d8 in the length direction L of the eighth peeling region P8 according to the present example embodiment is about 5 μm or more, for example.

Measurement of Dimension of Peeling Region in Length Direction

Hereinafter, a method of measuring the dimension of the peeling region P in the length direction L in the present example embodiment will be described. The measurement of the dimension of the peeling region P in the length direction L is performed based on observation with a scanning electron microscope (SEM).

The SEM observation for measuring the dimension in the length direction L of the peeling region P is performed in an LT cross section parallel or substantially parallel to the first lateral surface WS1 and the second lateral surface WS2 at a substantially middle position in the width direction W of the multilayer body 10.

First, in order to expose the LT cross section of the multilayer body 10 of the multilayer ceramic capacitor 1, a substantial middle position of the multilayer body 10 in the width direction W is polished.

The measurement target portion is photographed by SEM at a high magnification of 20000 times. The extending portion E and the outer edge of the multilayer body 10 are traced with the image photographed by the analysis software to specify the peeling region P, and the dimension d in the length direction L of the specified peeling region P is measured.

The first Ni plated layer 71A is provided so that a tensile stress is uniformly generated as a whole in a direction intersecting the thickness direction of the first plated layer 70A. In other words, tensile stress remains as internal stress inside the first Ni plated layer 71A. Since a tensile stress is generated in a direction intersecting the thickness direction of the first plated layer 70A, a portion of the first Ni plated layer 71A included in the extending portion E tends to shrink in a direction intersecting the thickness direction of the plated layer 70. The first electrically conductive resin layer 60A, which is fixed in contact with the portion of the first Ni plated layer 71A included in the extending portion E, receives a force from the portion of the first Ni plated layer 71A included in the extending portion E in a contracting direction, and compressive stress is generated. Therefore, in the extending portion E shown in FIG. 5, the first Ni plated layer 71A and the first electrically conductive resin layer 60A fixed in contact with the first Ni plated layer 71A in the extending portion E are subjected to a bending moment of warping toward the surface of the first plated layer 70A due to the resultant force of these internal stresses, such that peeling in the peeling region P of the extending portion E is promoted and the bending resistance is further improved.

In the extending portion E including the peeling region P in which the electrically conductive resin layer 60 is peeled off from the multilayer body 10, the end portion of the Ni plated layer 71 and the end portion of the Sn plated layer 72 are also peeled off from the multilayer body 10, and it is preferable that a tensile stress remains as an internal stress inside the Ni plated layer 71. With such a configuration, peeling of the extending portion E in the peeling region P is promoted, and the bending resistance is further improved.

When the dimension in the length direction of the multilayer ceramic capacitor 1 including the multilayer body 10 and the external electrode 40 is defined as an L dimension, the L dimension is preferably about 0.2 mm or more and about 10 mm or less, for example. When the dimension of the multilayer ceramic capacitor 1 in the lamination direction is defined as a T dimension, the T dimension is preferably about 0.1 mm or more and about 10 mm or less, for example. The dimension of the multilayer ceramic capacitor 1 in the width direction is defined as a W dimension. The W dimension is preferably about 0.1 mm or more and about 10 mm or less, for example.

Next, a non-limiting example of a method of manufacturing the multilayer ceramic capacitor 1 of the present example embodiment will be described. The method of manufacturing the multilayer ceramic capacitor 1 of the present example embodiment is not limited as long as it satisfies the above-mentioned requirements. However, a preferred manufacturing method includes the following processes. The details of each process will be described below.

A dielectric sheet for forming the dielectric layer 20 and an electrically conductive paste for forming the internal electrode layer 30 are prepared. The dielectric sheet and the electrically conductive paste for forming the internal electrodes include a binder and a solvent. The binder and the solvent may be well known.

The electrically conductive paste for forming the internal electrode layer 30 is printed on the dielectric sheet in a predetermined pattern by, for example, screen printing or gravure printing. Thus, a dielectric sheet having a pattern of the first internal electrode layer 31 and a dielectric sheet having a pattern of the second internal electrode layer 32 are prepared.

By laminating a predetermined number of dielectric sheets on which patterns of internal electrode layers are not printed, a portion functioning as the first main surface-side outer layer portion 12A adjacent to the first main surface TS1 is formed. A dielectric sheet on which the pattern of the first internal electrode layer 31 is printed and a dielectric sheet on which the pattern of the second internal electrode layer 32 is printed are sequentially laminated thereon, such that a portion functioning as the inner layer portion 11 is formed. A predetermined number of dielectric sheets on which patterns of internal electrode layers are not printed are laminated on a portion functioning as the inner layer portion 11, such that a portion functioning as the second main surface-side outer layer portion 12B adjacent to the second main surface TS2 is formed. Thus, a multilayer sheet is manufactured.

The multilayer sheet is pressed in the lamination direction via a hydrostatic press or the like to form a multilayer block.

By cutting the multilayer block into a predetermined size, the multilayer chip is cut out. At this time, the corner portions and ridge portions of the multilayer chip may be rounded by barrel polishing or the like.

The multilayer chip is fired to form the multilayer body 10. The firing temperature depends on the materials of the dielectric layer 20 and the internal electrode layer 30, but is preferably about 900° C. or higher and about 1400° C. or lower, for example.

An electrically conductive paste functioning as the base electrode layer 50 is applied to both end surfaces of the multilayer body 10. In the present example embodiment, the base electrode layer 50 is a fired layer. An electrically conductive paste including a glass component and a metal is applied to the multilayer body 10 by a method such as dipping. Then, firing treatment is performed to form the base electrode layer 50. The temperature of the firing treatment at this time is preferably about 700° C. or higher and about 950° C. or lower, for example.

Next, the electrically conductive resin layer 60 is formed. The electrically conductive resin layer 60 may be formed on the surface of the base electrode layer 50 or may be formed directly on the multilayer body 10. In the present example embodiment, the electrically conductive resin layer 60 is formed on the surface of the base electrode layer 50.

First, an electrically conductive resin paste in which an electrically conductive filler is dispersed in a thermosetting resin as a base resin functioning as a resin portion is prepared. The electrically conductive resin paste is produced by stirring and mixing the thermosetting resin and the electrically conductive filler. Accordingly, the electrically conductive filler is dispersed and present in a uniform distribution in the electrically conductive resin paste. Here, the thermosetting resin is, for example, an epoxy resin. The electrically conductive filler is, for example, Ag metal powder.

Then, the electrically conductive resin paste is applied on the base electrode layer 50 by a dipping method, and heat treatment is performed at a temperature of about 200° C. or higher and about 550° C. or lower, for example. Thus, the resin portion is thermally cured to form the electrically conductive resin layer 60. At this time, the atmosphere during the heat treatment is preferably an N2 atmosphere. In order to prevent scattering of the resin and to prevent oxidation of various metal components, the oxygen concentration is preferably suppressed to about 100 ppm or less, for example.

The film thickness of the electrically conductive resin layer at the ridge portion can be controlled by adjusting the viscosity of the resin electrode and the coating conditions. The peeling region can be controlled by adjusting the thickness of the electrically conductive resin layer or adjusting the thickness of Ni plating in which tensile stress described later remains.

Then, a plated layer 70 is formed on the surface of the electrically conductive resin layer 60. In the present example embodiment, the Ni plated layer 71 and the Sn plated layer 72 are formed on the electrically conductive resin layer 60. The Ni plated layer 71 and the Sn plated layer 72 are sequentially formed by using an electrolytic plating method. As a plating method, for example, barrel plating is preferably used.

The stress generated in the entire first Ni plated layer 71A and the entire second Ni plated layer 71B of an example embodiment of the present invention can be controlled by the following method.

It is known that the stress generated in plating varies depending on the electric current density applied during film formation. The electric current density is applied to the multilayer ceramic capacitor 1 in a random manner. In the tip portion of the Ni plated layer located on the first main surface TS1, the second main surface TS2, the first lateral surface WS1, or the second lateral surface WS2, the average electric current density applied to each tip portion from the initial stage of film formation of Ni plating until the thickness becomes, for example, about 3 μm is the same or substantially the same on any surface of the tip portion of the Ni plated layer located on the first main surface TS1, the second main surface TS2, the first lateral surface WS1, or the second lateral surface WS2. Therefore, the same or substantially the same stress is applied to all surfaces of the Ni plated layer 71 on the first main surface TS1, the second main surface TS2, the first lateral surface WS1, and the second lateral surface WS2.

The first Ni plated layer 71A and the second Ni plated layer 71B are formed by, for example, treating with a plating solution in which the amount of the stress relaxing agent is adjusted, such that Ni plating in which tensile stress remains as internal stress can be formed inside the Ni plated layer. Due to the residual stress, a bending moment warping toward the surface of the plated layer 70 acts, peeling of the extending portion E in the peeling region P is promoted, and the bending resistance is further improved.

In the present example embodiment, the Sn plated layer 72 is further provided on the Ni plated layer 71, the first Sn plated layer 72A is provided on the first Ni plated layer 71A, and the second Sn plated layer 72B is provided on the second Ni plated layer 71B. Electrolytic plating is used as a method of forming the Sn plated layer 72. Barrel plating is preferably used as a plating method. Thus, when the multilayer ceramic capacitor 1 is mounted, the wettability of solder used for mounting can be improved, and mounting can be easily performed. The multilayer ceramic capacitor 1 is manufactured by the manufacturing method described above.

According to the multilayer ceramic capacitor 1 of the present example embodiment, the following advantageous effects are obtained.

(1) The multilayer ceramic capacitor 1 according to the present example embodiment includes the multilayer body 10 including the plurality of dielectric layers 20 that are laminated, the first main surface TS1 and the second main surface TS2 that are opposed to each other in the height direction T, the first lateral surface WS1 and the second lateral surface WS2 that are opposed to each other in the width direction W orthogonal or substantially orthogonal to the height direction T, and the first end surface LS1 and the second end surface LS2 that are opposed to each other in the length direction L orthogonal or substantially orthogonal to the height direction T and the width direction W, the first internal electrode layer 31 that is on each of the plurality of dielectric layers 20 and exposed at the first end surface LS1, the second internal electrode layer 32 that is on each of the plurality of dielectric layers 20 and exposed at the second end surface LS2, the first external electrode 40A on the first end surface LS1, and the second external electrode 40B on the second end surface LS2. Each of the first external electrode 40A and the second external electrode 40B includes the base electrode layer 50 including a metal component, the electrically conductive resin layer 60 that is on the base electrode layer 50 and includes a filler powder and a resin component, and the plated layer 70 on the electrically conductive resin layer 60. The first external electrode 40A and the second external electrode 40B respectively include extending portions E, each extending to a portion of the first main surface TS1 and a portion of the second main surface TS2. The multilayer body 10 includes the ridge portion 10*a* at each of a portion where the first end surface LS1 and the first main surface TS1 intersect, a portion where the first end surface LS1 and the second main surface TS2 intersect, a portion where the second end surface LS2 and the first main surface TS1 intersect, and a portion where the second end surface LS2 and the second main surface TS2 intersect. The electrically conductive resin layer 60 is provided at each ridge portion 10*a* of the multilayer body 10. The electrically conductive resin layer 60 at the ridge portion 10*a* has a film thickness of about 0.8 μm or more and about 8 μm or less, for example. The electrically conductive resin layer 60 includes a peeling region P separating from the multilayer body 10 at least in one of the extending portions E. The peeling region P is provided in a region from an end portion of the electrically conductive resin layer 60 adjacent to a middle of the multilayer body in the length direction L to before an end of the base electrode layer 50 adjacent to the middle of the multilayer body in the length direction L. The peeling region P has a dimension of about 5 μm or more in the length direction, for example.

With such a configuration, since the electrically conductive resin layer 60 having a film thickness of about 0.8 μm or more and about 8 μm or less, for example, exists at the ridge portion 10*a* of the multilayer body 10, the bending stress is less likely to be transmitted to the multilayer body 10 at the ridge portion 10*a*, and thus it is possible to improve the bending resistance. In addition, since the peeling region P which has the dimension of about 5 μm or more, for example, in the length direction L and does not reach the base electrode layer 50 exists, the bending stress is less likely to be transmitted to the multilayer body 10, and thus it is possible to improve the bending resistance.

(2) According to the multilayer ceramic capacitor 1 according to the present example embodiment, the electrically conductive filler includes a Cu particle as a core, and at least a portion of a surface of each of the Cu particles is coated with a Cu—Ag alloy of Cu and Ag.

With such a configuration, the electric characteristics of the electrically conductive resin layer 60 can be improved, the affinity with the Ni plating can be improved, and it is possible to improve the bending resistance.

(3) The electrically conductive filler includes a flat powder or a spherical powder.

With such a configuration, the electric characteristics of the electrically conductive resin layer 60 can be improved, the affinity with the Ni plating can be improved, and it is possible to improve the bending resistance.

(4) The plated layer 70 includes the Ni plated layer 71 and the Sn plated layer 72 on the Ni plated layer 71, and tensile stress remains as internal stress inside the Ni plated layer 71.

With such a configuration, a tensile stress is applied to the electrically conductive resin layer 60, and peeling in the peeling region P is promoted, such that it is possible to further improve the bending resistance.

Experimental Examples

Multilayer ceramic capacitors including the configurations of FIGS. 1 to 5 were manufactured as samples of experimental examples and comparative examples by adopting the manufacturing method according to the above example embodiment. In the experimental examples and the comparative examples, an experiment for confirming the bending resistance by changing the corner thickness while fixing the peeling distance and an experiment for confirming the bending resistance by changing the peeling distance while fixing the corner thickness was performed with respect to the corner thickness which was the thickness of the electrically conductive resin layer at the ridge portion and the peeling distance which was the dimension in the length direction of the peeling region.

The peeling distance was defined as a distance from the tip of the external electrode 40 adjacent to the middle of the multilayer body 10 in the length direction L. Specifically, the experiments in which the corner thickness was changed while the peeling distance was fixed were performed under seven conditions in which the corner thickness was changed while the peeling distance was fixed at 5 μm as described in Table 1. The experiments in which the peeling distance was changed while the corner thickness was fixed was performed under seven conditions in which the peeling distance was changed while the corner thickness was fixed at about 0.8 μm, for example, as described in Table 2.

Regarding the number of samples to be evaluated, for 20 samples arbitrarily extracted from the same lot for each of the above-described conditions, the corner thickness and the peeling distance were respectively confirmed by the above-described measurement method, and the average values thereof were obtained. In order to confirm the bending resistance, for each of the above conditions, 20 different samples from the same lot as those used for the measurements of the corner thickness and the peeling distance were extracted, and each of them was measured to evaluate crack.

As for the samples, the corner thickness and the peeling distance were controlled by the method described in the above production method so that the corner thickness and the peeling distance under the conditions described in Tables 1 and 2 were obtained. Example specifications of the multilayer ceramic capacitors are as follows.

Dimensions of multilayer ceramic capacitors: 1.5 mm (length direction L)×0.5 mm (width direction W)×0.5 mm (lamination direction T)

Ceramic material: $BaTiO_3$

Capacitance: 0.01 μF

Rated voltage: 50 V

Configuration of external electrode (1) Base Electrode Layer: Electrode Including Electrically Conductive Metal (Cu) and Glass Component Thickness of the base electrode layer at the middle portion in the height direction of the base electrode layer located at each of the first end surface and the second end surface: 20 μm Thickness of the base electrode layer at the middle portion in the length direction of the base electrode layer located on each of the first main surface, the second main surface, the first lateral surface, and the second lateral surface: 4 μm (2) Electrically Conductive Resin Layer Electrically conductive resin layer portion: electrically conductive filler: Cu particles coated with Cu—Ag alloys Resin: thermosetting type Thickness of the first electrically conductive resin layer portion at the middle portion in the height direction located on each of the first end surface and the second end surface: 20 μm The thickness of the base electrode layer at the middle portion in the length direction of the base electrode layer located on each of the first main surface, the second main surface, the first lateral surface, and the second lateral surface: 20 μm (3) Ni Plated Layer Thickness of Ni plated layer: the thickness of the Ni plated layer at the middle portion in the height direction of the Ni plated layer located on each of the first end surface and the second end surface: 3.0 μm The thickness of the Ni plated layer at the middle portion in the length direction of the Ni plated layer located on each of the first main surface, the second main surface, the first lateral surface, and the second lateral surface: 4.0 μm (4) Sn Plated Layer Thickness of Sn plated layer: thickness of the Sn plated layer at the middle portion in the height direction of the Sn plated layer located on each of the first end surface and the second end surface: 4.0 μm The thickness of the Sn plated layer at the middle portion in the length direction of the Sn plated layer located on each of the first main surface, the second main surface, the first lateral surface, and the second lateral surface: 4.0 μm Next, the samples of the experimental examples and the comparative examples were subjected to a bending test according to the following method. The prepared multilayer ceramic capacitors were subjected to a bending test according to the method of JIS C 6484, and the presence or absence of cracks in the dielectric layer was evaluated when the bending amount was fixed to 5 mm. In the bending test, "X" (cross symbol) was determined when a crack occurred, and "○" (circle symbol) was determined when a crack did not occur. The results of the bending test are shown in Tables 1 and 2.

TABLE 1

| | COMPARATIVE EXAMPLE | COMPARATIVE EXAMPLE | EXPERIMENTAL EXAMPLE | EXPERIMENTAL EXAMPLE | EXPERIMENTAL EXAMPLE | EXPERIMENTAL EXAMPLE | COMPARATIVE EXAMPLE |
|---|---|---|---|---|---|---|---|
| CORNER THICKNESS [μm] | 0 | 0.5 | 0.8 | 2 | 4 | 8 | 10 |
| PEELING DISTANCE [μm] | 5 | 5 | 5 | 5 | 5 | 5 | 5 |
| BENDING TEST RESULT | x | x | ○ | ○ | ○ | ○ | x |

TABLE 2

| | COMPARATIVE EXAMPLE | COMPARATIVE EXAMPLE | EXPERIMENTAL EXAMPLE | EXPERIMENTAL EXAMPLE | EXPERIMENTAL EXAMPLE | EXPERIMENTAL EXAMPLE | COMPARATIVE EXAMPLE |
|---|---|---|---|---|---|---|---|
| CORNER THICKNESS [μm] | 0.8 | 0.8 | 0.8 | 0.8 | 0.8 | 0.8 | 0.8 |
| PEELING DISTANCE [μm] | 0 | 2 | 5 | 20 | 50 | 100 | (REACHING THE TIP OF BASE ELECTRODE) |
| BENDING TEST RESULT | x | x | ○ | ○ | ○ | ○ | x |

As shown in Table 1, no cracks occurred in the multilayer ceramic capacitor having a corner thickness of about 0.8 μm as the experimental example; whereas, cracks occurred in the multilayer body in the multilayer ceramic capacitor having a corner thickness of about 0.5 μm as the comparative example.

As shown in Table 1, cracks did not occur in the multilayer ceramic capacitor having a corner thickness of about 8 μm as the experimental example, whereas, in the multilayer ceramic capacitor having a corner thickness of about 10 μm and the multilayer ceramic capacitor having no electrically conductive resin layer at the ridge portion as the comparative example, cracks occurred in each of the multilayer bodies.

It is considered that, when the corner thickness was small, stress concentration occurred inside the base electrode layer 50, and cracks starting from the inside of the base electrode layer 50 occurred. It is considered that, when the corner thickness is thick, although stress concentration did not occur inside the base electrode layer 50, stress was applied to the end portion of the base electrode layer 50 and stress concentration occurred, and therefore, cracks occurred. From the experimental results, it was confirmed that, when the corner thickness was about 0.8 μm or more and about 8 μm or less, for example, the propagation of the bending stress to the multilayer body 10 was reduced or prevented, and the bending resistance was improved.

As shown in Table 2, no cracks occurred in the multilayer ceramic capacitor having a peeling distance of about 5 μm of the experimental example, whereas, cracks occurred in the multilayer body in the multilayer ceramic capacitor having no peeling region and the multilayer ceramic capacitor having a corner thickness of about 2 μm of the comparative example.

As shown in Table 2, no cracks occurred in the multilayer ceramic capacitor of the experimental example, whereas, cracks occurred in the multilayer body in the multilayer ceramic capacitor of the comparative example in which the peeling region reached the end portion of the base electrode layer.

It is considered that, when the peeling region was small at the end portion of the base electrode layer 50, stress concentration at the end portion of the base electrode layer 50 could not be relaxed and cracks starting from the end portion of the base electrode layer 50 occurred. It is considered that, when the peeling region reached the base electrode layer 50, since stress was concentrated at the end portion of the base electrode layer 50, cracks starting from the end portion of the base electrode layer 50 occurred. From the experimental results, it was confirmed that, when the peeling distance was about 5 μm or more, for example, and the peeling region did not reach the end portion of the base electrode, the propagation of the bending stress to the multilayer body 10 was reduced or prevented, and the bending resistance was improved.

Figure 7:
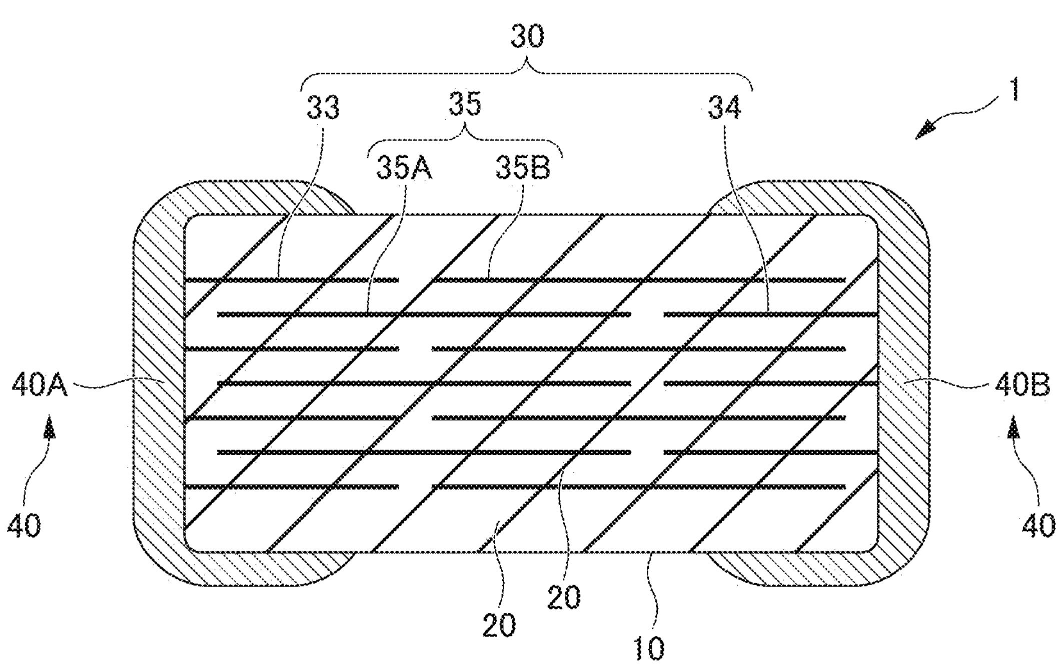
FIG. 7 is a schematic view of an example of a configuration of a multilayer ceramic capacitor including a three-portion structure.
Figure 8:
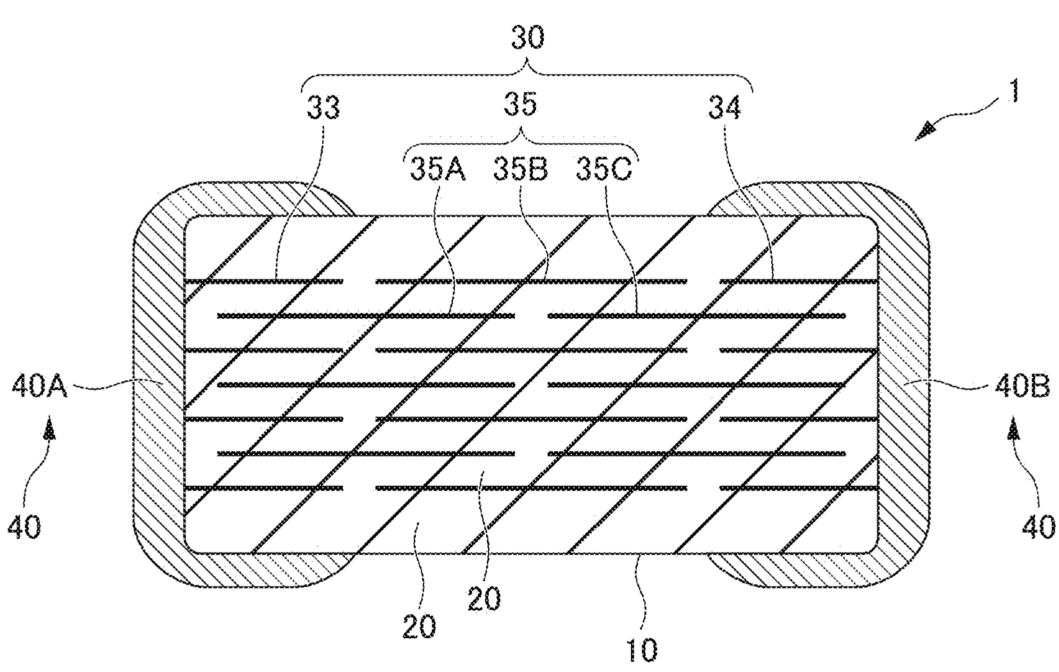
FIG. 8 is a schematic view of an example of a configuration of a multilayer ceramic capacitor including a four-portion structure.

The configuration of the multilayer ceramic capacitor 1 is not limited to the configurations shown in FIGS. 1 to 4. For example, the multilayer ceramic capacitor 1 may be a multilayer ceramic capacitor including a two-portion structure, a three-portion structure, or a four-portion structure as shown in FIGS. 6, 7, and 8.

Figure 6:
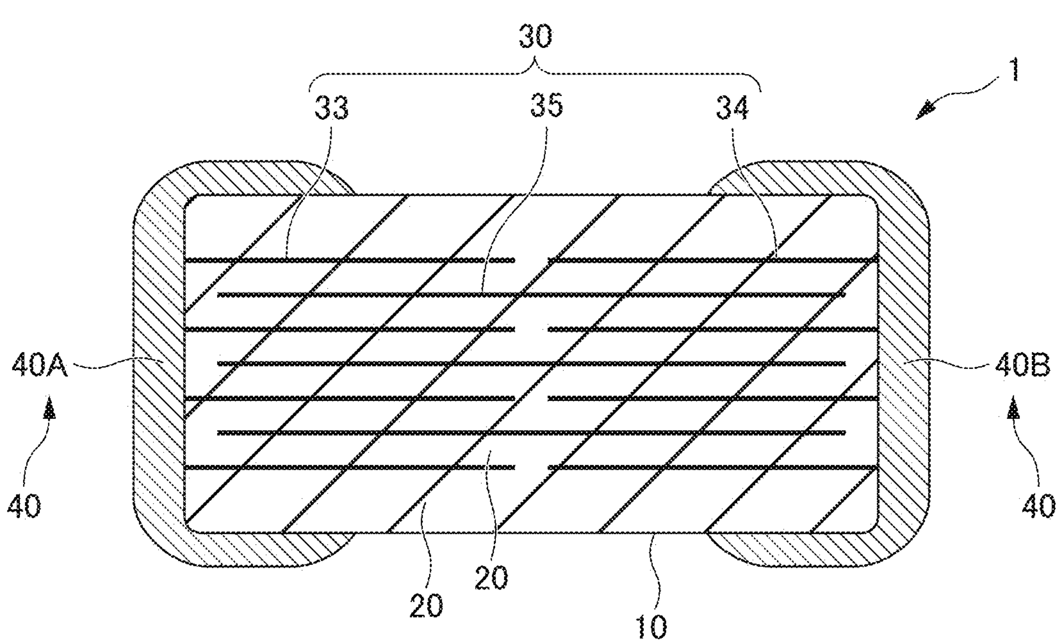
FIG. 6 is a schematic view of an example of a configuration of a multilayer ceramic capacitor including a two-portion structure.

The multilayer ceramic capacitor 1 shown in FIG. 6 is a multilayer ceramic capacitor 1 including a two-portion structure, and includes, as internal electrode layers 30, floating internal electrode layers 35 which are not exposed at either the first end surface LS1 or the second end surface LS2 in addition to the first internal electrode layers 33 and the second internal electrode layers 34. The multilayer ceramic capacitor 1 shown in FIG. 7 is a multilayer ceramic capacitor 1 including a three-portion structure including first floating internal electrode layers 35A and second floating internal electrode layers 35B as floating internal electrode layers 35. The multilayer ceramic capacitor 1 shown in FIG. 8 is a multilayer ceramic capacitor 1 including a four-portion structure including first floating internal electrode layers 35A, second floating internal electrode layers 35B, and third floating internal electrode layers 35C as floating internal electrode layers 35. As described above, by providing the floating internal electrode layers 35 as the internal electrode layers 30, the multilayer ceramic capacitor 1 has a structure in which the counter electrode portions are divided into a plurality of portions. With such a configuration, a plurality of capacitor components are provided between the opposing internal electrode layers 30, and these capacitor components are connected in series. Therefore, the voltages applied to the respective capacitor components are reduced, and thus it is possible to improve the pressure resistance of the multilayer ceramic capacitor 1. In addition, the multilayer ceramic capacitor 1 of the present example embodiment may include a multiple-portion structure of four or more.

The multilayer ceramic capacitor 1 may be of a two-terminal type including two external electrodes or of a multi-terminal type including a large number of external electrodes.

The present invention is not limited to example embodiments of the present invention, and can be appropriately modified and applied without departing from the gist of the present invention. The present invention also includes combinations of two or more of the individual desirable configurations described in the above example embodiments.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers that are laminated, a first main surface and a second main surface that are opposed to each other in a height direction, a first lateral surface and a second lateral surface that are opposed to each other in a width direction orthogonal or substantially orthogonal to the height direction, and a first end surface and a second end surface that are opposed to each other in a length direction orthogonal or substantially orthogonal to the height direction and the width direction;

a first internal electrode layer that is on each of the plurality of dielectric layers and exposed at the first end surface;

a second internal electrode layer that is on each of the plurality of dielectric layers and exposed at the second end surface;

a first external electrode on the first end surface; and a second external electrode on the second end surface; wherein each of the first external electrode and the second external electrode includes a base electrode layer including a metal component, an electrically conductive resin layer that is on the base electrode layer and includes a filler powder and a resin component, and a plated layer on the electrically conductive resin layer;

the first external electrode and the second external electrode respectively include extending portions, each extending to a portion of the first main surface and a portion of the second main surface;

the multilayer body includes a ridge portion at each of a portion where the first end surface and the first main surface intersect, a portion where the first end surface and the second main surface intersect, a portion where the second end surface and the first main surface intersect, and a portion where the second end surface and the second main surface intersect;

the electrically conductive resin layer is provided at each ridge portion of the multilayer body;

the electrically conductive resin layer at the ridge portion has a film thickness of about 0.8 μm or more and about 8 μm or less;

the electrically conductive resin layer includes a peeling region separated from the multilayer body at least in one of the extending portions;

the peeling region extends from an end portion of the electrically conductive resin layer adjacent to a middle of the multilayer body in the length direction to before an end of the base electrode layer adjacent to the middle of the multilayer body in the length direction; and the peeling region has a dimension of about 5 μm or more in the length direction.

2. The multilayer ceramic capacitor according to claim 1, wherein the filler powder includes a Cu particle as a core, and at least a portion of a surface of each of the Cu particles is coated with a Cu—Ag alloy of Cu and Ag.

3. The multilayer ceramic capacitor according to claim 1, wherein the filler powder includes a flat powder or a spherical powder.

4. The multilayer ceramic capacitor according to claim 1, wherein the plated layer includes a Ni plated layer and a Sn plated layer on the Ni plated layer; and tensile stress remains as internal stress inside the Ni plated layer.

5. The multilayer ceramic capacitor according to claim 1, wherein the plated layer covers the electrically conductive resin layer.

6. The multilayer ceramic capacitor according to claim 1, wherein the resin component includes a thermosetting resin and a curing agent.

7. The multilayer ceramic capacitor according to claim 4, wherein thicknesses of the Ni plated layer and the Sn plated layer are about 5 μm or more and about 15 μm or less.

8. The multilayer ceramic capacitor according to claim 1, wherein the electrically conductive resin layer is a buffer layer.

9. The multilayer ceramic capacitor according to claim 1, wherein the electrically conductive resin layer is more flexible than the base electrode layer.

10. The multilayer ceramic capacitor according to claim 9, wherein the base electrode layer includes glass and the metal component.

11. The multilayer ceramic capacitor according to claim 1, wherein the filler powder includes a metal to define an electric current carrying path in the electrically conductive resin layer.

12. The multilayer ceramic capacitor according to claim 11, wherein the metal includes Ag, an alloy of Ag, or a metal powder including an Ag coating on a surface of the metal powder.

13. The multilayer ceramic capacitor according to claim 11, wherein the metal includes an Ag coating on a surface of the metal powder and Cu, Ni, Sn, or Bi or an alloy powder of Cu, Ni, Sn, or Bi.

14. The multilayer ceramic capacitor according to claim 11, wherein the filler powder is a metal powder including Sn, Ni, or Cu, coated with Ag, Cu, Ni, Sn, or Bi or an alloy of Ag, Cu, Ni, Sn, or Bi.

15. The multilayer ceramic capacitor according to claim 1, wherein the filler powder includes a flat powder and a spherical powder.

16. The multilayer ceramic capacitor according to claim 1, wherein an average particle diameter of the filler powder is about 0.3 μm or more and about 10 μm or less.

17. The multilayer ceramic capacitor according to claim 1, wherein the multilayer body includes eight of the extending portions and eight of the ridge portions.

18. The multilayer ceramic capacitor according to claim 1, wherein the multilayer body includes eight of the ridge portions.

19. The multilayer ceramic capacitor according to claim 1, wherein the multilayer body includes eight of the peeling regions.

20. The multilayer ceramic capacitor according to claim 1, further comprising a two-portion structure, a three-portion structure, or a four-portion structure, and a two terminal structure or a three terminal structure.

* * * * *